(12) United States Patent
Sawai et al.

(10) Patent No.: US 10,211,934 B2
(45) Date of Patent: Feb. 19, 2019

(54) COMMUNICATION CONTROL APPARATUS, COMMUNICATION CONTROL METHOD AND RADIO COMMUNICATION APPARATUS

(71) Applicant: SONY CORPORATION, Tokyo (JP)

(72) Inventors: Ryo Sawai, Tokyo (JP); Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/803,390

(22) Filed: Nov. 3, 2017

(65) Prior Publication Data

US 2018/0062775 A1 Mar. 1, 2018

Related U.S. Application Data

(63) Continuation of application No. 14/758,360, filed as application No. PCT/JP2013/081410 on Nov. 21, 2013, now Pat. No. 9,825,721.

(30) Foreign Application Priority Data

Feb. 22, 2013 (JP) ................ 2013-033452

(51) Int. Cl.
*H04W 52/24* (2009.01)
*H04B 17/345* (2015.01)
(Continued)

(52) U.S. Cl.
CPC ......... *H04B 17/345* (2015.01); *H04B 17/354* (2015.01); *H04W 16/14* (2013.01); *H04W 52/243* (2013.01)

(58) Field of Classification Search
CPC ..... H04W 52/243; H04W 16/14; H04B 17/34
(Continued)

(56) References Cited

U.S. PATENT DOCUMENTS 6,042,925 A 3/2000 Kerr
6,954,616 B2 10/2005 Liang
(Continued)

FOREIGN PATENT DOCUMENTS

CN 101400118 A 4/2009
EP 2 043 402 A2 4/2009
(Continued)

OTHER PUBLICATIONS

Extended European Search Report dated Sep. 6, 2016 in Patent Application No. 13875913.9.
(Continued)

*Primary Examiner* — Congvan Tran
(74) *Attorney, Agent, or Firm* — Xsensus LLP

(57) ABSTRACT

Provided is a communication control apparatus including: an information acquisition unit that acquires channel arrangement information for a first frequency channel on which an interference signal is transmitted and a second frequency channel on which a desired signal to be interfered from the interference signal is transmitted, the first frequency channel and the second frequency channel being a combination of frequency channels that can be partially overlapped with each other; and an interference control unit that determines overlapping on a frequency axis between the first frequency channel and the second frequency channel on the basis of the channel arrangement information, and calculates a protection ratio for protecting the second frequency channel from interference according to the determined overlapping.

18 Claims, 21 Drawing Sheets

(51) Int. Cl.
*H04W 16/14* (2009.01)
*H04B 17/354* (2015.01)

(58) Field of Classification Search
USPC .... 455/423, 450, 502, 422.1, 446, 454, 448, 455/452.1, 451
See application file for complete search history.

(56) References Cited

U.S. PATENT DOCUMENTS

| | | |
|---|---|---|
| 9,072,102 B2 | 6/2015 | Yavuz |
| 9,161,234 B2 | 10/2015 | Sawai |
| 2008/0318585 A1 | 12/2008 | Kauser |
| 2009/0088083 A1 | 4/2009 | Fujii et al. |
| 2010/0104042 A1 | 4/2010 | Benjebbour |
| 2010/0171838 A1 | 7/2010 | Yoon et al. |
| 2011/0028177 A1 | 2/2011 | Nakasato |
| 2011/0092234 A1* | 4/2011 | Kim ............... H04W 48/14 455/507 |
| 2011/0249579 A1* | 10/2011 | Hu ................ H04L 5/001 370/252 |
| 2011/0319066 A1* | 12/2011 | Chou .............. H04W 36/0077 455/422.1 |
| 2012/0113843 A1* | 5/2012 | Watfa ............. H04W 72/1289 370/252 |
| 2012/0178467 A1* | 7/2012 | Fujii .............. H04W 72/0406 455/452.1 |
| 2012/0201159 A1 | 8/2012 | Morita |
| 2012/0201162 A1 | 8/2012 | Kim |
| 2012/0281602 A1 | 11/2012 | Tsunekawa |
| 2013/0040688 A1 | 2/2013 | Mizusawa |
| 2013/0217429 A1 | 8/2013 | Kimura et al. |
| 2013/0252620 A1* | 9/2013 | Kobayashi ........ H04W 52/325 455/446 |
| 2013/0310047 A1 | 11/2013 | Aoyagi |
| 2014/0056247 A1 | 2/2014 | Bharucha |
| 2015/0110024 A1* | 4/2015 | Manssour ......... H04W 72/1226 370/329 |

FOREIGN PATENT DOCUMENTS

| | | |
|---|---|---|
| JP | 2009-100452 A | 5/2009 |
| JP | 2012-151815 A | 8/2012 |
| WO | WO 2008/147092 A1 | 12/2008 |

OTHER PUBLICATIONS

"Report ITU-R BT.2215 Measurements of protection ratios and overload thresholds for broadcast TV receivers BT Series Broadcasting service (television)" ITU-R, XP055298629, May 2011, 17 Pages.

Hiromasa Fujii et al., "Performance Analysis of Adaptive TPC Spectrum Sharing under Multicell Environments", IEICE Technical Report. SR, Software Radio, vol. 108, No. 250, The Institute of Electronics, Information and Communication Engineers, Oct. 23, 2008, 10 pages.

International Search Report dated Feb. 4, 2014 in PCT/JP2013/081410.

Office Action dated Feb. 6, 2018 in Japanese Patent Application No. 2015-501274 (with English language translation) 14 pages.

Chinese Office Action dated Apr. 3, 2018 for Chinese Application No. 201380072974.4 with English translation.

* cited by examiner

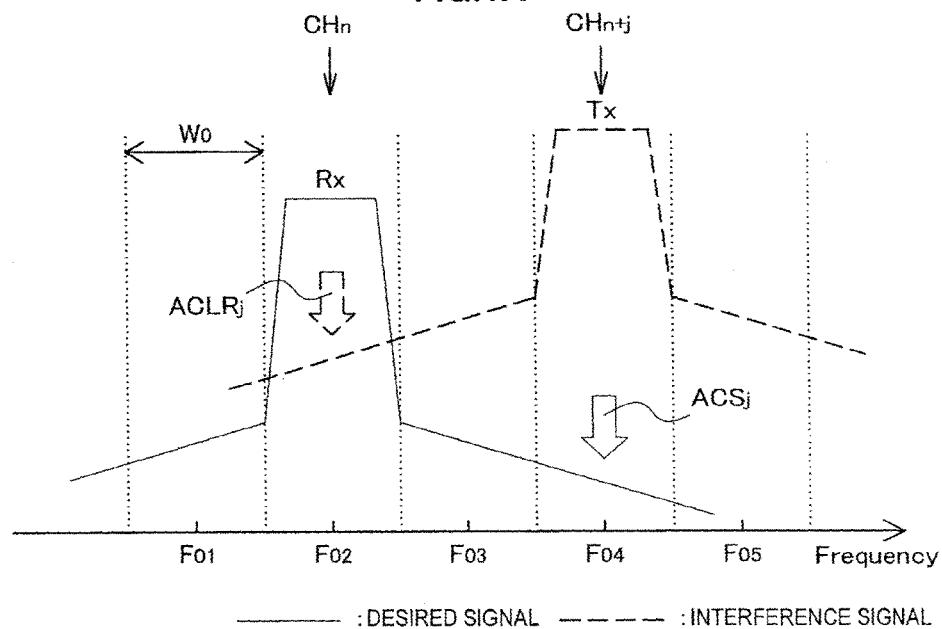
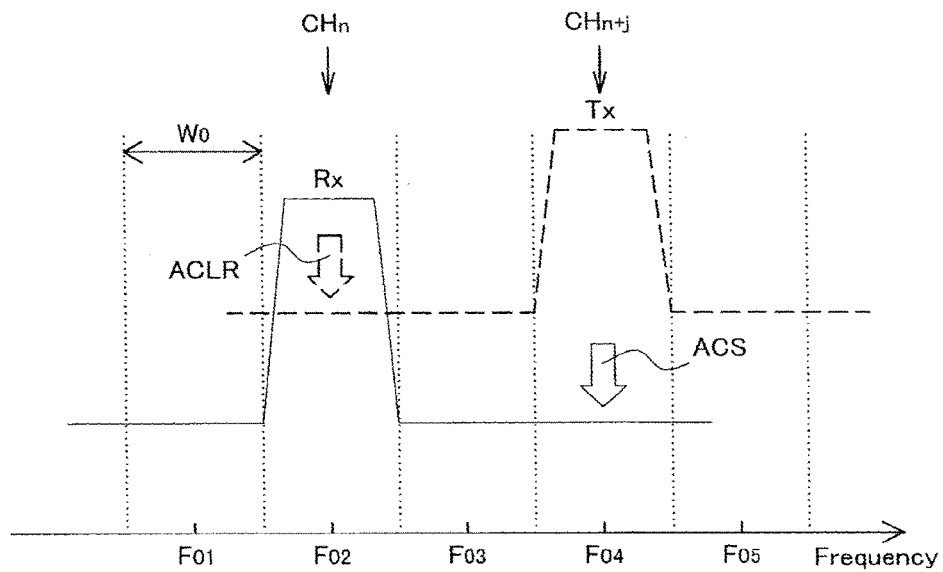

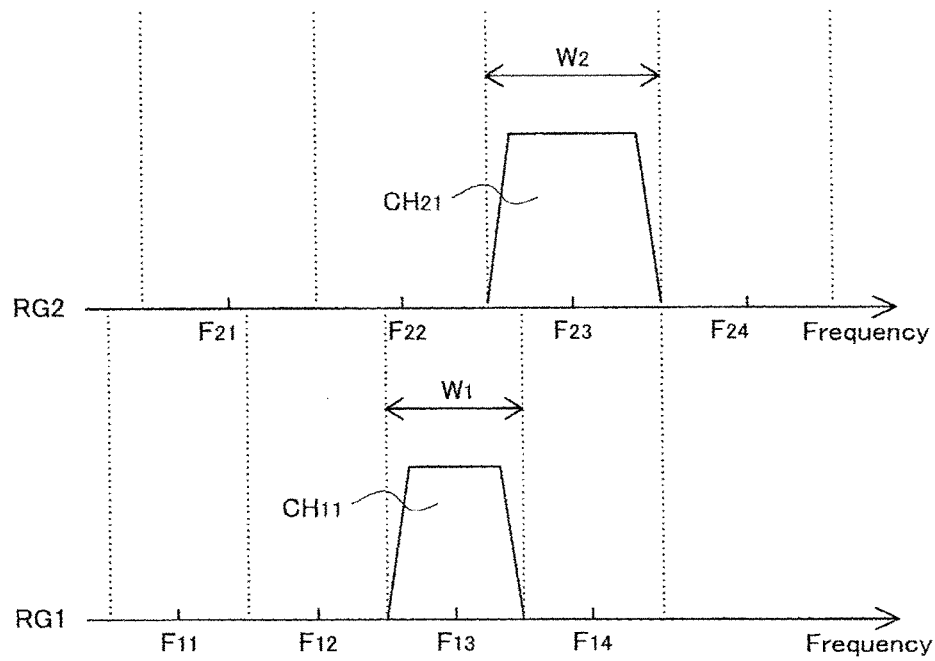
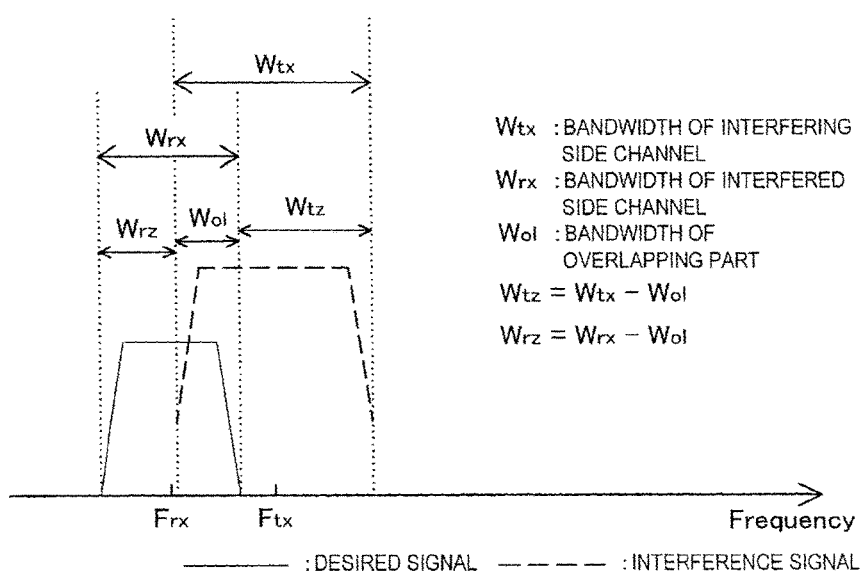

(Case 1) NO OVERLAPPING PART (Case 2) INTERFERING SIDE INCLUDES INTERFERED SIDE (Case 3) PARTIAL OVERLAPPING (Case 4) INTERFERED SIDE INCLUDES INTERFERING SIDE

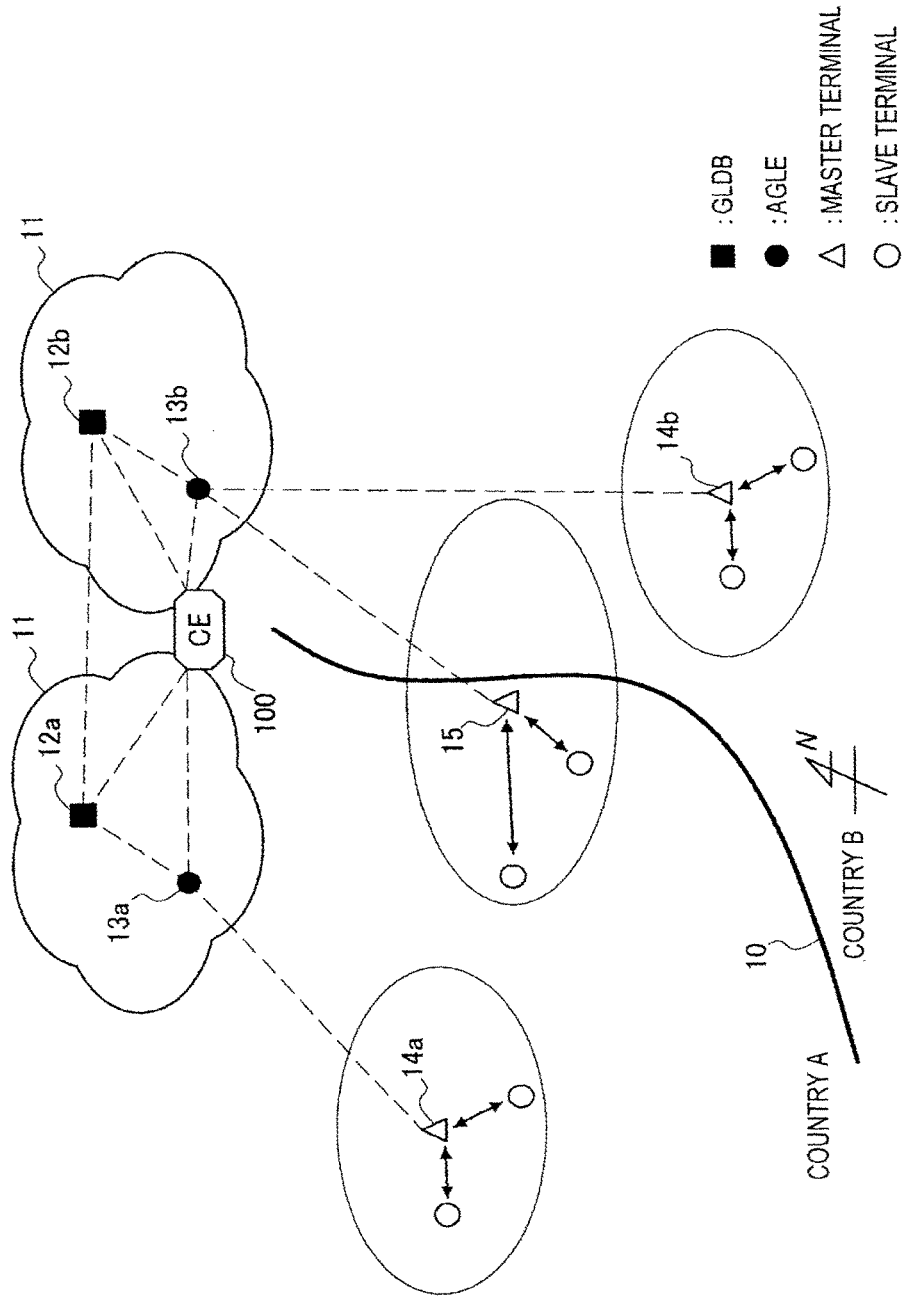

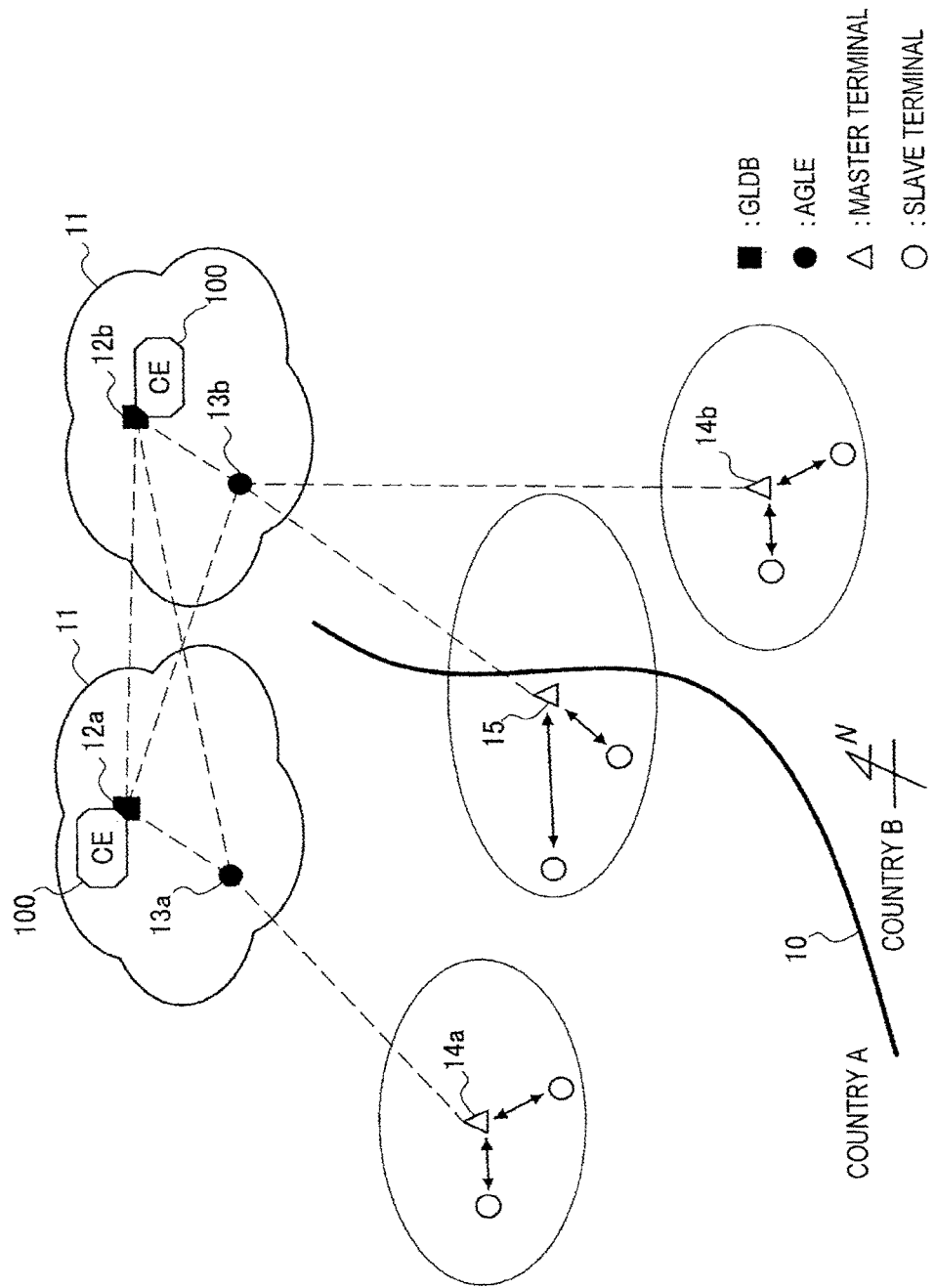

⟵⟶ : SIGNALING PATH

↔ : SIGNALING PATH

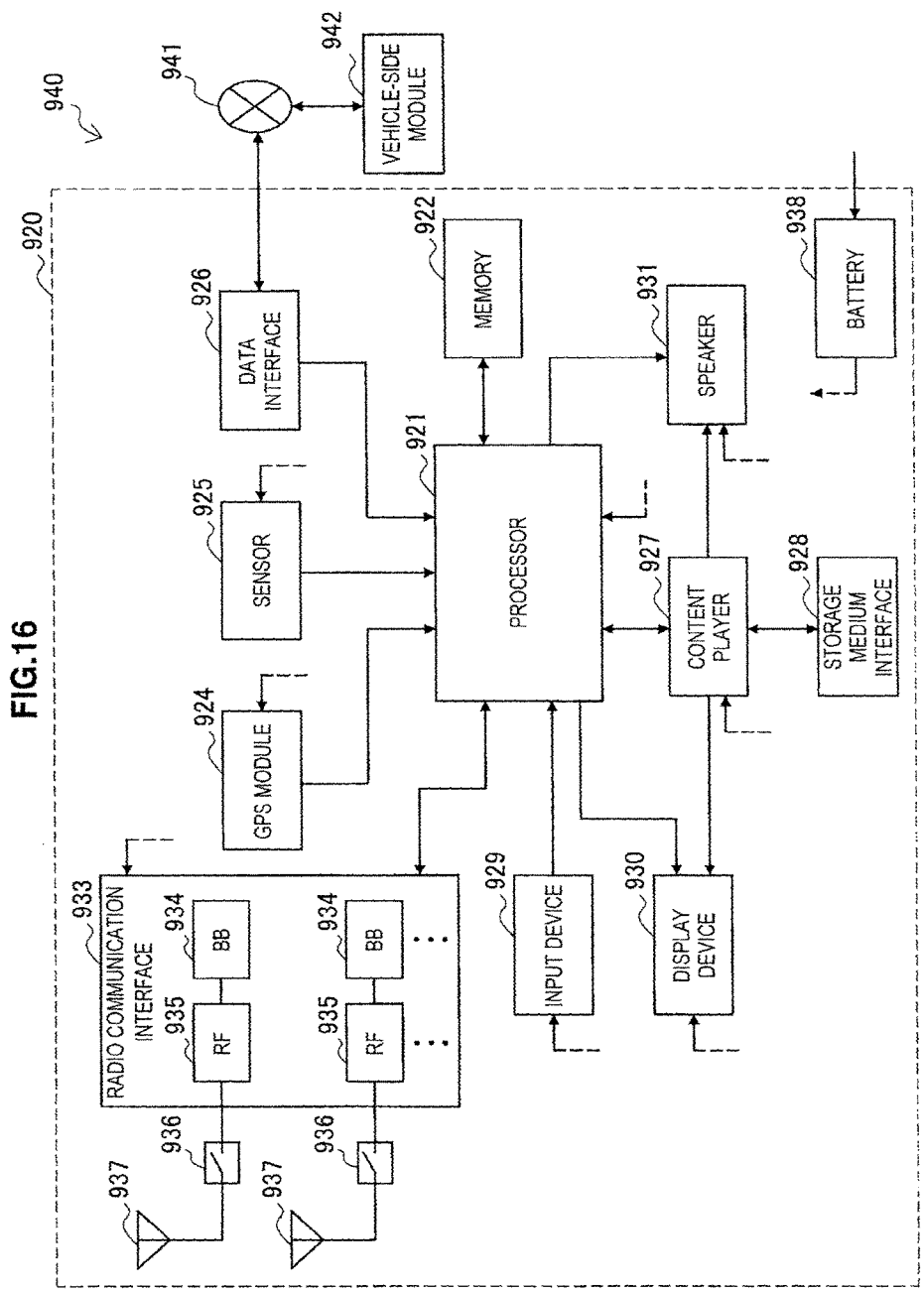

COMMUNICATION CONTROL APPARATUS, COMMUNICATION CONTROL METHOD AND RADIO COMMUNICATION APPARATUS

CROSS-REFERENCE TO RELATED APPLICATIONS

The present application is a continuation of U.S. application Ser. No. 14/758,360, filed Jun. 29, 2015, which is a National Stage Entry of Application No. PCT/JP2013/081410, filed Nov. 21, 2013, which claims priority to Japanese Patent Application No. 2013-033452, filed in Japan on Feb. 22, 2013. The entire contents of each of the above are incorporated herein by reference.

TECHNICAL FIELD

The present disclosure relates to a communication control apparatus, a communication control method, and a radio communication apparatus.

BACKGROUND ART

A recent radio communication environment has been facing the problem of depletion of frequency resources due to a rapid increase in data traffic. Then, there has been an active discussion about a framework for releasing a frequency band given usage permission for a specific carrier but not used, for secondary communication. Such a frame work for the secondary communication is also called a licensed shared access (LSA). For example, European conference of postal and telecommunications administrations (CEPT) has proposed a technical requirement for devices that secondarily use a so-called "TV white space" not used for a television broadcasting (white space devices: WSDs) (see, for example, Non-Patent Literature 1 below).

Generally, transmission power of a transmitter secondarily using a frequency band is limited so as to prevent harmful interference to a receiver as a primary system. For example, in order to properly control the transmission power of the WSD, there has been proposed the installation of a geo-location database (GLDB) that provides information such as coverage, a position of a digital terrestrial television (DTT) receiver and an allowable interference level of a DTT system as a primary system (see, for example, Non-Patent Literature 1 below). Since the usage permission of the frequency band is normally given for each country (or region), the GLDB would be also installed for each country (or region). The GLDB can also perform such as a calculation of a protection ratio for protecting the primary system from the interference. A method for calculating the protection ratio has been presented (see, for example, Non-Patent Literature 2 below).

It has been proposed that an advanced geo-location engine (AGLE) for using the information provided from the GLDB to maximize a system capacity of a secondary system through a more advanced calculation is installed, for example, by a country or a third party (see, for example, Non-Patent Literature 3 below). It has been determined that the approach of installing the AGLE is adopted by an office of communications (OfCom) as a frequency management body in the UK, and a database developer as a third party.

CITATION LIST

Non-Patent Literature

Non-Patent Literature 1: ECC (Electronic Communications Committee), "TECHNICAL AND OPERATIONAL REQUIREMENTS FOR THE POSSIBLE OPERATION OF COGNITIVE RADIO SYSTEMS IN THE 'WHITE SPACES' OF THE FREQUENCY BAND 470-790 MHz", ECC REPORT 159, January 2011

Non-Patent Literature 2: ECC (Electronic Communications Committee), "Complementary Report to ECC Report 159; Further definition of technical and operational requirements for the operation of white space devices in the band 470-790 MHz", ECC REPORT 185, September 2012

Non-Patent Literature 3: Naotaka Sato (Sony Corporation), "TV WHITE SPACE AS PART OF THE FUTURE SPECTRUM LANDSCAPE FOR WIRELESS COMMUNICATIONS", ETSI Workshop on Reconfigurable Radio Systems, Dec. 12, 2012, Cannes (France)

SUMMARY OF INVENTION

Technical Problem

The allocation of the frequency band in each country is normally performed for each frequency channel formed by dividing the frequency band according to any frequency division scheme. When a number is given for each frequency channel in this case, channels having the same number become the same channels having bands matched with each other, and channels having different numbers become different channels having bands not overlapped with each other. The calculation formula of the protection ratio described in Non-Patent Literature 2 is based on such assumption.

However, in a case of the secondary usage around a boundary of a country or a region, a radio signal transmitted on a frequency channel permitted for the secondary usage may give the interference to the radio signal received on another frequency channel in another country. Further, these frequency channels may not be the combination of the frequency channels obtained by the division according to one division scheme. The similar problem may occur not only in the TV white space, but also, for example, in the flexible allocation of the frequency channel to a small cell when the small cell secondarily uses a frequency band protected for a macro cell. In an existing control system for transmission power, these cases are not sufficiently considered.

Therefore, it is desirable that, in a case of the interference of the radio signal between frequency channels as the combination of frequency channels that can be partially overlapped with each other, a new system capable of properly controlling power of the interference signal is realized.

Solution to Problem

According to the present disclosure, there is provided a communication control apparatus including: an information acquisition unit that acquires channel arrangement information for a first frequency channel on which an interference signal is transmitted and a second frequency channel on which a desired signal to be interfered from the interference signal is transmitted, the first frequency channel and the second frequency channel being a combination of frequency channels that can be partially overlapped with each other; and an interference control unit that determines overlapping on a frequency axis between the first frequency channel and the second frequency channel on the basis of the channel arrangement information, and calculates a protection ratio for protecting the second frequency channel from interference according to the determined overlapping.

According to the present disclosure, there is provided a communication control method executed by a communication control apparatus, the communication control method including: acquiring channel arrangement information for a first frequency channel on which an interference signal is transmitted and a second frequency channel on which a desired signal to be interfered from the interference signal is transmitted, the first frequency channel and the second frequency channel being a combination of frequency channels that can be partially overlapped with each other; determining overlapping on a frequency axis between the first frequency channel and the second frequency channel on the basis of the channel arrangement information; and calculating a protection ratio for protecting the second frequency channel from interference according to the determined overlapping.

According to the present disclosure, there is provided a radio communication apparatus including: a communication unit that communicates with a communication control apparatus that calculates, according to overlapping on a frequency axis between a first frequency channel and a second frequency channel, the overlapping being determined based on channel arrangement information for the first frequency channel on which an interference signal is transmitted and the second frequency channel on which a desired signal to be interfered from the interference signal is transmitted, the first frequency channel and the second frequency channel being a combination of frequency channels that can be partially overlapped with each other, a protection ratio for protecting the second frequency channel from interference; and a communication control unit that transmits information indicating a transmission characteristic of a radio signal of the radio communication apparatus itself to the communication control apparatus via the communication unit, and uses transmission power not violating the protection ratio calculated using the transmission characteristic by the communication control apparatus to perform radio communication on the first frequency channel.

Advantageous Effects of Invention

According to the technology according to the present disclosure, in a case of the interference of a radio signal between frequency channels as the combination of frequency channels that can be partially overlapped with each other, it is possible to properly control power of the interference signal.

BRIEF DESCRIPTION OF DRAWINGS

FIG. 1A is a first explanatory diagram for explaining an example of an existing method for calculating a protection ratio.

FIG. 1B is a second explanatory diagram for explaining an example of an existing method for calculating a protection ratio.

FIG. 2 is an explanatory diagram for explaining an example of a combination of frequency channels specified according to different division schemes.

FIG. 3 is an explanatory diagram for explaining parameters related to overlapping between the frequency channels.

FIG. 6A is an explanatory diagram illustrating a first example of an arrangement of a control entity.

FIG. 6C is an explanatory diagram illustrating a third example of an arrangement of a control entity.

FIG. 16 is a block diagram illustrating an example of a schematic configuration of a car navigation apparatus.

DESCRIPTION OF EMBODIMENTS

Figure 4A:
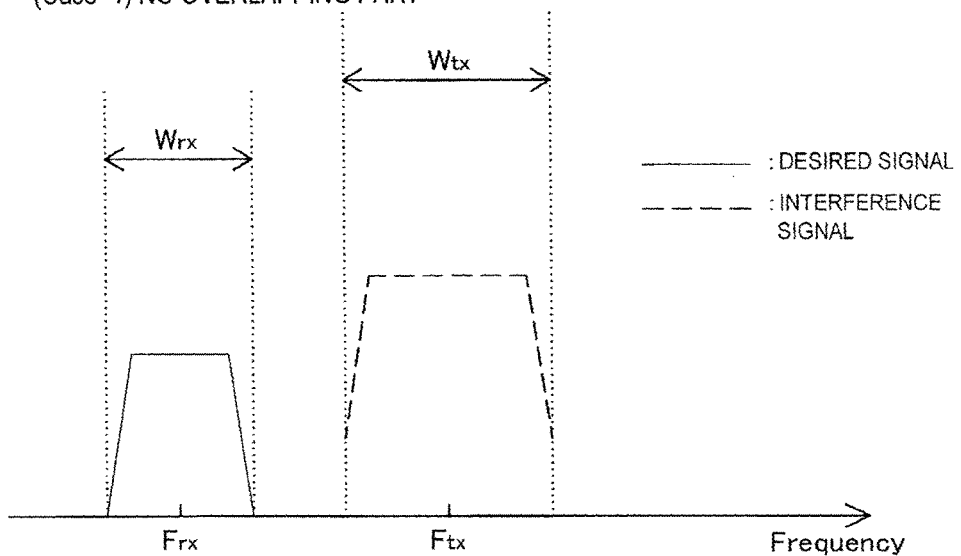
FIG. 4A is an explanatory diagram for explaining a first example of an overlapping relationship between the frequency channel on an interfering side and the frequency channel on an interfered side.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Furthermore, description will be provided in the following order.
1. Outline
1-1. Existing method
1-2. Explanation of problem
1-3. New method
2. Configuration of apparatus
2-1. Arrangement of control entity
2-2. Configuration example of control entity
2-3. Configuration example of master terminal
2-4. Flow of processing
3. Application example
3-1. Arrangement of control entity
3-2. Application to various products
4. Summary
<1. Outline>
[1-1. Existing Method]

First, using FIG. 1A and FIG. 1B, an existing method described in Non-Patent Literature 2 will be described.

FIG. 1A is a first explanatory diagram for explaining an example of an existing method for calculating a protection ratio. With reference to FIG. 1A, there are shown five frequency channels formed by evenly dividing a frequency axis by a fixed bandwidth. In these frequency channels, a bandwidth of is $W_0$, and center frequencies are $F_{01}$, $F_{02}$, $F_{03}$, $F_{04}$ and $F_{05}$, respectively. A primary system is assumed to be given usage permission for these five frequency channels, and to use only a frequency channel $CH_n$ having the center frequency $F_{02}$. A desired signal indicated by the solid line in the drawing is a radio signal of the primary system. On the other hand, a frequency channel $CH_{n+j}$ is not used by the primary system. Therefore, the frequency channel $CH_{n+j}$ can be released to a secondary system for efficient usage of frequency resources. When the secondary system transmits a radio signal on the frequency channel $CH_{n+j}$, the radio signal is viewed as an interference signal from a viewpoint of the primary system (the dotted line in the drawing). Therefore, transmission power used by the secondary system is required to be determined so that the interference in the primary system does not exceed an allowable level. Then, Non-Patent Literature 2 has proposed that a protection ratio $PR_{adj}$ calculated as expressed by Formula (1) is applied to the secondary system.

[Math. 1]

$$PR_{adj} = PR_{Co} + 10 \log(10^{-ACLR_j/10} + 10^{-ACS_j/10}) \quad (1)$$

In Formula (1), $PR_{Co}$ is a predefined protection ratio applied to transmission on a co-channel. $ACLR_j$ is an adjacent channel leakage ratio for a channel having a channel number separated by j. The $ACLR_j$ is one of transmission characteristics of a transmitter transmitting the interference signal, and represents a rate of reception power measured on a receiving side on the n-th frequency channel to transmission power on the n+j-th frequency channel. $ACS_j$ is adjacent channel selectivity for a channel having a channel number separated by j. The $ACS_j$ is one of reception characteristics of a receiver receiving the interference, and represents a rate of an attenuation amount of the interference signal on the n+j-th frequency channel to an attenuation amount of the desired signal on the n-th frequency channel. The $ACLR_j$ and $ACS_j$ are measured in advance through a test of the transmitter and receiver.

In the example of FIG. 1A, the ideal line is drawn in which the $ACLR_j$ is reduced with increasing distance from the frequency channel $CH_{n+j}$, and the $ACS_j$ is reduced with increasing distance from the frequency channel $CH_n$. However, many of actual transmitters and receivers do not have such ideal transmission characteristics and reception characteristics. Then, in order to make system implementation easier, the adoption of the ACLR and ACS without depending on an offset j of the channel number is also prevalent. In the example of FIG. 1B, the ACLR and ACS are constant without depending on the offset j between the frequency channel on which the desired signal is transmitted and the frequency channel on which the interference signal is transmitted.

[2-2. Explanation of Problem]

In the examples of FIG. 1A and FIG. 1B, even when any two pairs are taken out from the five frequency channels, the frequency channels taken out are not overlapped with each other on the frequency axis. Therefore, it is possible to calculate the protection ratio according to Formula (1) by using the transmission characteristics and the reception characteristics measured in advance, and the offset of the channel number. However, for example, when the secondary system is operated around a national boundary, a radio signal transmitted on a frequency channel permitted for the secondary usage in a certain country may give the interference to another frequency channel specified according to a different frequency division scheme in an adjacent country. In this case, the combination of the frequency channel on an interfering side and the frequency channel on an interfered side is not identical to the combination of the frequency channels obtained by the division according to one division scheme.

FIG. 2 is an explanatory diagram for explaining an example of a combination of frequency channels specified according to different division schemes. The frequency axis in the lower column of FIG. 2 is related to a first frequency division scheme RG1. The frequency axis in the upper column of FIG. 2 is related to a second frequency division scheme RG2. For example, the first frequency division scheme RG1 is adopted in a first country, and the frequency band is divided into four frequency channels having a bandwidth $W_1$ and center frequencies $F_{11}$, $F_{12}$, $F_{13}$ and $F_{14}$, respectively. The second frequency division scheme RG2 is adopted in a second country adjacent to the first country, and the frequency band is divided into four frequency channels having a bandwidth $W_2$ and center frequencies $F_{21}$, $F_{22}$, $F_{23}$ and $F_{24}$, respectively. Here, for example, when it is permitted that the secondary system uses a frequency channel $CH_{21}$ around a national boundary of the second country, a radio signal transmitted by the second system may give the interference to the primary system transmitted on a frequency channel $CH_{11}$ in the first country. However, in the example of FIG. 2, the frequency channel $CH_{11}$ and the frequency channel $CH_{21}$ are not channels fully equal to each other or fully separated from each other. In such as case, in order to calculate the protection ratio to be applied to the secondary system, Formula (1) cannot be used as it is.

[1-3. New Method]

Accordingly, the technology according to the present disclosure introduces a new method obtained by extending the existing method described above. In the technology according to the present disclosure, on the basis of the arrangement of the channels for the frequency channel on the interfering side and the frequency channel on the interfered side, overlapping on the frequency axis between these channels is determined. Then, the protection ratio for protecting the frequency channel on the interfered side from the interference is calculated according to the determined overlapping.

FIG. 3 is an explanatory diagram for explaining parameters related to the overlapping between the frequency channels. With reference to FIG. 3, the interference signal and the desired signal transmitted on the frequency channels overlapped with each other are indicated by the dotted line and the solid line, respectively. The frequency channel of the interference signal has a center frequency $F_{tx}$ and a bandwidth $W_{tx}$. The frequency channel of the desired signal has a center frequency $F_{rx}$ and a bandwidth $W_{rx}$. In this case, a bandwidth $W_{ol}$ of the overlapped part between the frequency channels can be calculated as follows.

[Math. 2]

$$W_{ol} = \frac{W_{tx}}{2} + \frac{W_{rx}}{2} - |F_{tx} - F_{rx}| \quad (2)$$

Further, by using the overlapped bandwidth $W_{ol}$, a remaining bandwidth $W_{tz}$ on the interfering side and a remaining bandwidth $W_{rz}$ on the interfered side are calculated as follows.

[Math. 3]

$$W_{tz} = W_{tx} - W_{ol} \quad (3)$$

$$W_{rz} = W_{rx} - W_{ol} \quad (4)$$

By using these parameters, Formula (1) described above is extended as expressed by Formula as follows. Note that, for the convenience of the description, the ACLR and ACS are assumed to be constant without depending on the offset j between the channels.

[Math. 4]

$$PR_{adj} = PR_{Co} + 10\log(w_1 + w_2 \, 10^{-ACLR/10} + w_3 \, 10^{-ACS/10} + IM) \quad (5)$$

where $$w_1 = \frac{W_{ol}}{W_{tx}}, \, w_2 = \frac{W_{rz}}{W_{rx}}, \, w_3 = \frac{W_{tz}}{W_{tx}}$$

The antilog of the logarithmic term in the right side of Formula (5) includes four terms. The first term thereof is a component corresponding to the interference of the co-channel. The second term is a component corresponding to the ACLR of the apparatus transmitting the inference signal. The third term is a component corresponding to the ACS of the apparatus receiving the desired signal. The fourth term is an interference margin component of zero or non-zero. Weights $w_1$, $w_2$ and $w_3$ are applied to the first terms, the second term and the third term, respectively. The weight $w_1$ is a rate of the overlapped bandwidth $W_{ol}$ to the bandwidth $W_{tx}$ of the frequency channel on the interfering side. The weight $w_2$ is a rate of the remaining bandwidth $W_{rz}$ on the interfered side to the bandwidth $W_{rx}$ of the frequency channel on the interfered side. The weight $w_3$ is a rate of the remaining bandwidth $W_{tz}$ on the interfering side to the bandwidth $W_{tx}$ of the frequency channel on the interfering side. There will be described below how the protection ratio calculation formula of Formula (5) is applied to five overlapping relationships of the frequency channels. Note that, in the description below, for the convenience of the description, the interference margin component IM is assumed to be zero. A case where the interference margin component is not zero will be further described later.

(1) First Example

FIG. 4A is an explanatory diagram for explaining a first example of the overlapping relationship between the frequency channel on the interfering side and the frequency channel on the interfered side. In the first example, the frequency channel on the interfering side and the frequency channel on the interfered side are not overlapped with each other. In this case, because of the overlapped bandwidth $W_{ol}=0$, the remaining bandwidth on the interfering side $W_{tz}=W_{tx}$, and the remaining bandwidth on the interfered side $W_{rz}=W_{rx}$, Formula (5) is modified as follows.

$$PR_{adj} = PR_{Co} + 10\log\left(\frac{0}{W_{tx}} + \frac{W_{rx}}{W_{rx}}10^{-ACLR/10} + \frac{W_{tx}}{W_{tx}}10^{-ACS/10}\right) \quad [\text{Math. 5}]$$

$$= PR_{Co} + 10\log(10^{-ACLR/10} + 10^{-ACS/10})$$

That is, in this case, the protection ratio calculation formula equals to Formula (1) in the existing method.

(2) Second Example

Figure 4B:
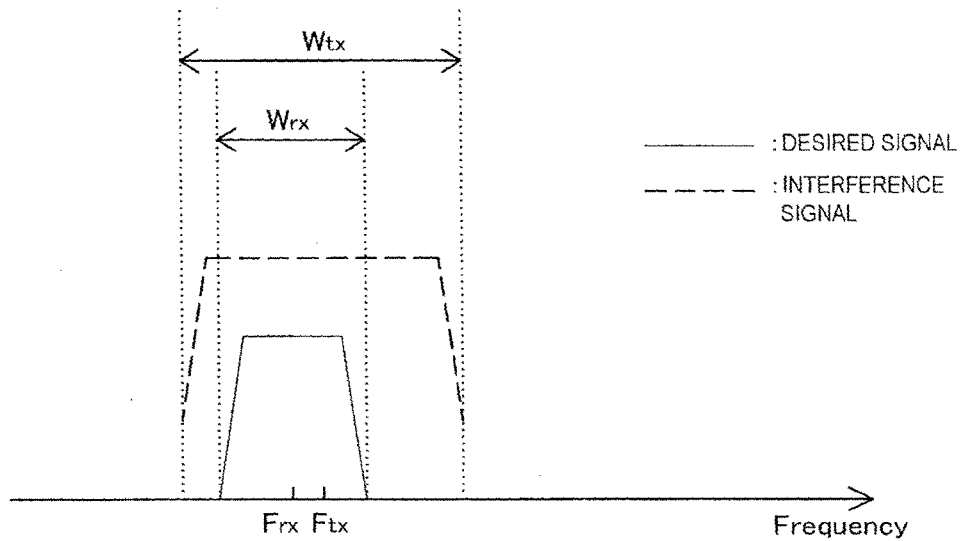
FIG. 4B is an explanatory diagram for explaining a second example of an overlapping relationship between the frequency channel on an interfering side and the frequency channel on an interfered side.

FIG. 4B is an explanatory diagram for explaining a second example of the overlapping relationship between the frequency channel on the interfering side and the frequency channel on the interfered side. In the second example, the frequency channel on the interfering side includes the frequency channel on the interfered side. In this case, because of the overlapped bandwidth $W_{ol}=W_{rx}$, the remaining bandwidth on the interfering side $W_{tz}=W_{tx}-W_{rx}$, and the remaining bandwidth on the interfered side $W_{rz}=0$, Formula (5) is modified as follows.

$$PR_{adj} = PR_{Co} + 10\log\left(\frac{W_{rx}}{W_{tx}} + \frac{0}{W_{rx}}10^{-ACLR/10} + \frac{W_{tx}-W_{rx}}{W_{tx}}10^{-ACS/10}\right) \quad [\text{Math. 6}]$$

$$= PR_{Co} + 10\log\left(\frac{W_{rx}}{W_{tx}} + \left(1 - \frac{W_{rx}}{W_{tx}}\right)10^{-ACS/10}\right)$$

(3) Third Example

Figure 4C:
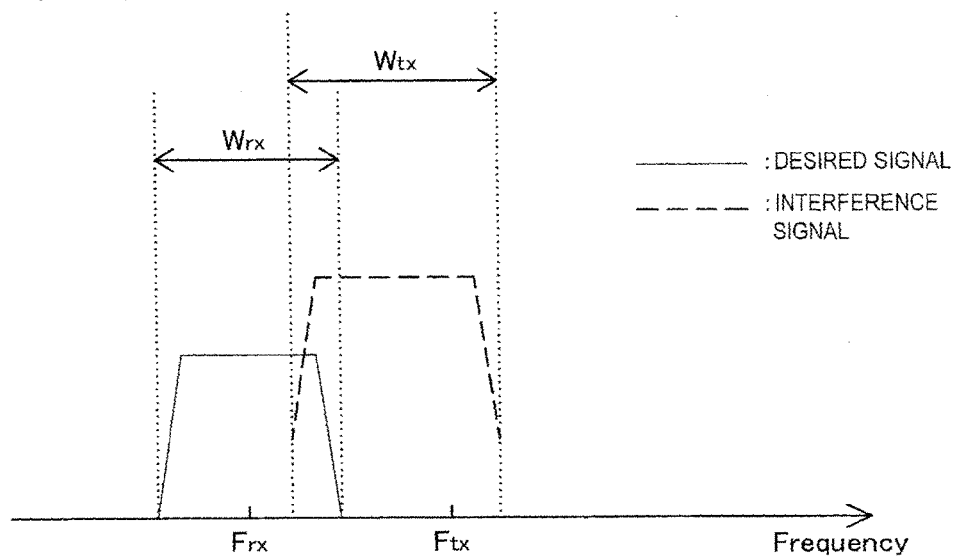
FIG. 4C is an explanatory diagram for explaining a third example of an overlapping relationship between the frequency channel on an interfering side and the frequency channel on an interfered side.

FIG. 4C is an explanatory diagram for explaining a third example of the overlapping relationship between the frequency channel on the interfering side and the frequency channel on the interfered side. In the third example, the frequency channel on the interfering side and the frequency channel on the interfered side are partially overlapped with each other. In this case, because of the remaining bandwidth on the interfering side $W_{tz}=W_{tx}-W_{ol}$, and the remaining bandwidth on the interfered side $W_{rz}=W_{rx}-W_{ol}$, Formula (5) is modified as follows.

[Math. 7]

$$PR_{adj} = PR_{Co} + 10\log\left(\frac{W_{ol}}{W_{tx}} + \frac{W_{rx}-W_{ol}}{W_{rx}}10^{-ACLR/10} + \frac{W_{tx}-W_{ol}}{W_{tx}}10^{-ACS/10}\right)$$

$$= PR_{Co} + 10\log\left(\frac{W_{ol}}{W_{tx}} + \left(1-\frac{W_{ol}}{W_{rx}}\right)10^{-ACLR/10} + \left(1-\frac{W_{ol}}{W_{tx}}\right)10^{-ACS/10}\right)$$

(4) Fourth Example

Figure 4D:
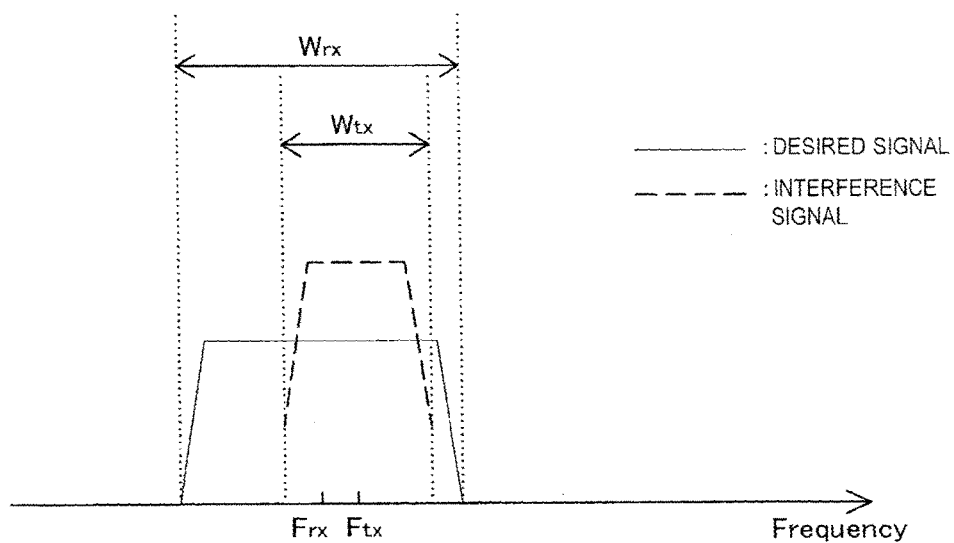
FIG. 4D is an explanatory diagram for explaining a fourth example of an overlapping relationship between the frequency channel on an interfering side and the frequency channel on an interfered side.

FIG. 4D is an explanatory diagram for explaining a fourth example of the overlapping relationship between the frequency channel on the interfering side and the frequency channel on the interfered side. In the fourth example, the frequency channel on the interfering side is included by the frequency channel on the interfered side. In this case, because of the overlapped bandwidth $W_{ol}=W_{tx}$, the remaining bandwidth on the interfering side $W_{tz}=0$, and the remaining bandwidth on the interfered side $W_{rz}=W_{rx}-W_{tx}$, Formula (5) is modified as follows.

[Math. 8]

$$PR_{adj} = PR_{Co} + 10\log\left(\frac{W_{tx}}{W_{tx}} + \frac{W_{rx}-W_{tx}}{W_{rx}}10^{-ACLR/10} + \frac{0}{W_{tx}}10^{-ACS/10}\right)$$

$$= PR_{Co} + 10\log\left(1 + \left(1-\frac{W_{tx}}{W_{rx}}\right)10^{-ACLR/10}\right)$$

(5) Fifth Example

Figure 4E:
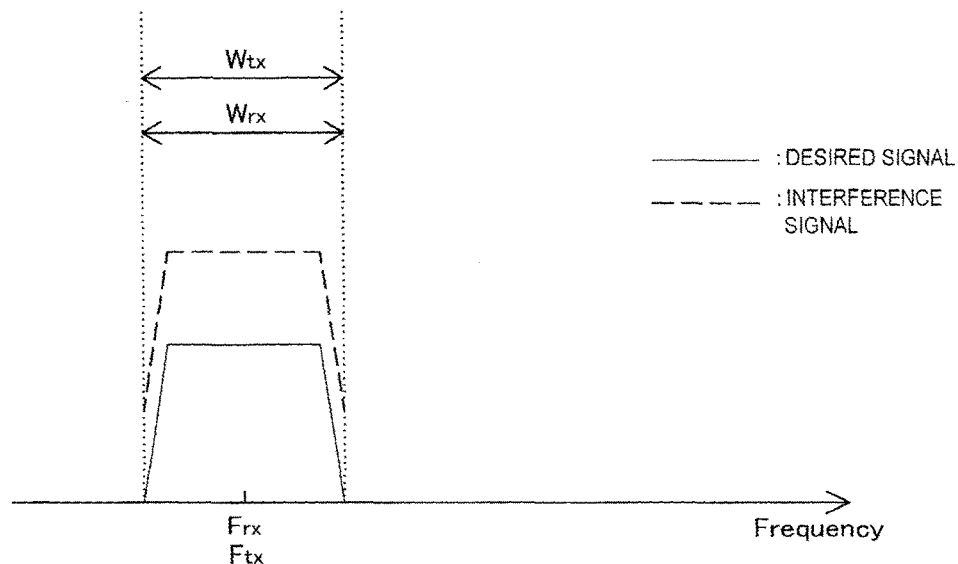
FIG. 4E is an explanatory diagram for explaining a fifth example of an overlapping relationship between the frequency channel on an interfering side and the frequency channel on an interfered side.

FIG. 4E is an explanatory diagram for explaining a fifth example of the overlapping relationship between the frequency channel on the interfering side and the frequency channel on the interfered side. In the fifth example, the frequency channel on the interfering side matches the frequency channel on the interfered side. In this case, because of the overlapped bandwidth $W_{ol}=W_{tx}=W_{rx}$, the remaining bandwidth on the interfering side $W_{tz}=0$, and the remaining bandwidth on the interfered side $W_{rz}=0$, Formula (5) is modified as follows.

[Math. 9]

$$PR_{adj} = PR_{Co} + 10\log\left(\frac{W_{tx}}{W_{tx}} + \frac{0}{W_{rx}}10^{-ACLR/10} + \frac{0}{W_{tx}}10^{-ACS/10}\right)$$

$$= PR_{Co}$$

That is, in this case, the calculated protection ratio equals to the protection ratio $PR_{Co}$ applied to the transmission on the co-channel.

Note that, when the ACLR and ACS depending on the offset j between the channels are used, the component corresponding to the ACLR and the component corresponding to the ACS in Formula (5) may be decomposed into two or more components, respectively.

(6) Plurality of Interference Signals

When a plurality of interference signals interfering with the desired signal exist, it is desirable to calculate an aggregate protection ratio in consideration of the plurality of interference signals. An aggregate protection ratio $PR_{agg}$ when the plurality of interference signals exist can be calculated as expressed by Formula as follows.

[Math. 10] (6)

$$PR_{agg} = 10\log\left(\sum_{k=1}^{N_{tx}}10^{(PR_{adj,k}/10)}\right)$$

In Formula (6), $N_{tx}$ represents the number of interference signals to be considered, and $PR_{adj,k}$ represents an individual protection ratio provisionally calculated for the k-th interference signal according to Formula (5) described above.

Figure 5:
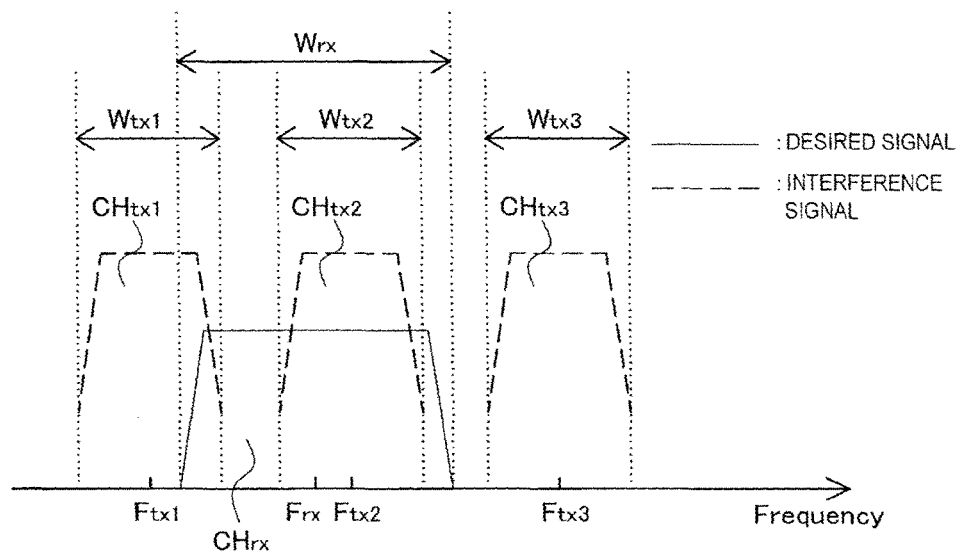
FIG. 5 is an explanatory diagram illustrating an example of a condition that a plurality of interference signals exist.

FIG. 5 is an explanatory diagram illustrating an example of a condition that the plurality of interference signals exist. In the example of FIG. 5, a frequency channel $CH_{rx}$ on the interfered side on which the desired signal is transmitted has a center frequency $F_{rx}$ and a bandwidth $W_{rx}$. In the frequency channel $CH_{rx}$, three frequency channels $CH_{tx1}$, $CH_{tx2}$ and $CH_{tx3}$ on the interfering side exist. The frequency channel $CH_{tx1}$ has a center frequency $F_{tx1}$, and a bandwidth $W_{tx1}$. Since the frequency channels $CH_{tx1}$ and the frequency channel $CH_{rx}$ are partially overlapped with each other, the individual protection ratio for the frequency channel $CH_{tx1}$ can be calculated according to the case described using FIG. 4C. The frequency channel $CH_{tx2}$ has a center frequency $F_{tx2}$, and a bandwidth $W_{tx2}$. Since the frequency channels $CH_{tx2}$ is included by the frequency channel $CH_{rx}$, the individual protection ratio for the frequency channel $CH_{tx2}$ can be calculated according to the case described using FIG. 4D. The frequency channel $CH_{tx3}$ has a center frequency $F_{tx3}$, and a bandwidth $W_{tx3}$. Since the frequency channels $CH_{tx3}$ has no partially overlapped part with the frequency channel $CH_{rx}$, the individual protection ratio for the frequency channel $CH_{tx3}$ can be calculated according to the case described using FIG. 4A. The aggregate protection ratio can be calculated by substituting the individual protection ratios provisionally calculated in this manner for Formula (6). Note that a weight coefficient for each interference signal may be added to Formula (6).

Typically, the frequency channels $CH_{fx1}$, $CH_{fx2}$ and $CH_{fx3}$ exemplified in FIG. 5 are frequency channels to be allocated to the different secondary systems, respectively, and the radio signals can be transmitted on these frequency channels from the different apparatuses, respectively. However, the frequency channels $CH_{fx1}$, $CH_{fx2}$ and $CH_{fx3}$ are not limited to such an example, and may be a channel group for transmitting the plurality of radio signals from the single apparatus by using frequency hopping technology. When the frequency hopping technology is applied to Formula (6), a weight coefficient according to the usage rate for each frequency channel in the hopping sequence may be added to Formula (6).

(7) Interference Margin

The interference margin of Formula (5) may be a fixed value, or may be a value dynamically set depending on the number of secondary systems or the number of devices participating in the secondary system (see, for example, JP 2012-151815A). Further, the interference margin 1M may be determined depending on how many GLDBs (or frequency management bodies) manage the frequency channels considered in the calculation of the protection ratio. As an example, when the frequency channels managed by M different countries or regions are considered in the calculation of the protection ratio, the interference margin $IM=\log_{10}(M)$ [dB] may be satisfied. Further, the interference margin IM may be determined depending on which of the GLDBs (or frequency management bodies) manages the frequency channel considered in the calculation of the protection ratio. For example, when the frequency channels managed by a specific country or region are considered, a specific value of the interference margin IM may be used. Note that the interference margin IM may be defined not in a form of an added component as expressed by Formula (5) but in a form of a coefficient multiplied by any term.

<2. Configuration of Apparatus>

[2-1. Arrangement of Control Entity]

In an embodiment, a control entity for calculating the protection ratio according to the new method described in the previous section is introduced. The control entity may be arranged on the existing any control node (for example, the GLDB or AGLE), or may be arranged on a control node newly provided.

FIG. 6A is an explanatory diagram illustrating a first example of an arrangement of the control entity. With reference to FIG. 6A, a boundary 10 between a country A and a country B is illustrated. The boundary 10 may not always correspond to the national boundary, and may be flexibly set in terms of management of the frequency band. Further, the technology according to the present disclosure can be broadly applied to the control of the secondary usage not only in the boundary of countries but in the boundary of regions that can include a community, a state or a prefecture. A GLDB 12a is a regulatory database that manages data for the frequency channels managed by the country A. An AGLE 13a is a secondary system management node operated by a frequency management body or a third party in the country A. A GLDB 12b is a regulatory database that manages data for the frequency channels managed by the country B. An AGLE 13b is a secondary system management node operated by a frequency management body or a third party in the country B. A communication control apparatus 100 is a control node in which the control entity is arranged. In the first example, the communication control apparatus 100 is implemented as a physically independent apparatus from the regulatory database and the secondary system management node and is connected to the regulatory database and the secondary system management node in a communicable manner. A master terminal 14a is a terminal apparatus operating the secondary system within the region of the country A. Transmission power of the master terminal 14a can be determined by the GLDB 12a or AGLE 13a. A master terminal 14b is a terminal apparatus operating the secondary system within the region of the country B. Transmission power of the master terminal 14b can be determined by the GLDB 12b or AGLE 13b. A master terminal 15 is a terminal apparatus operating the secondary system adjacent to the boundary 10 within the region of the country A. A radio signal transmitted by the master terminal 15 (or a slave terminal connected to the master terminal 15) may give the interference not only to the primary system in the country A but to the primary system in the country B. Then, for example, when the master terminal 15 starts operating the secondary system, the AGLE 13a can request the calculation of the protection ratio for the master terminal 15 to the communication control apparatus 100. The AGLE 13a then allocates the transmission power to the master terminal 15 by using the calculation result in the notice from the communication control apparatus 100.

Figure 6B:
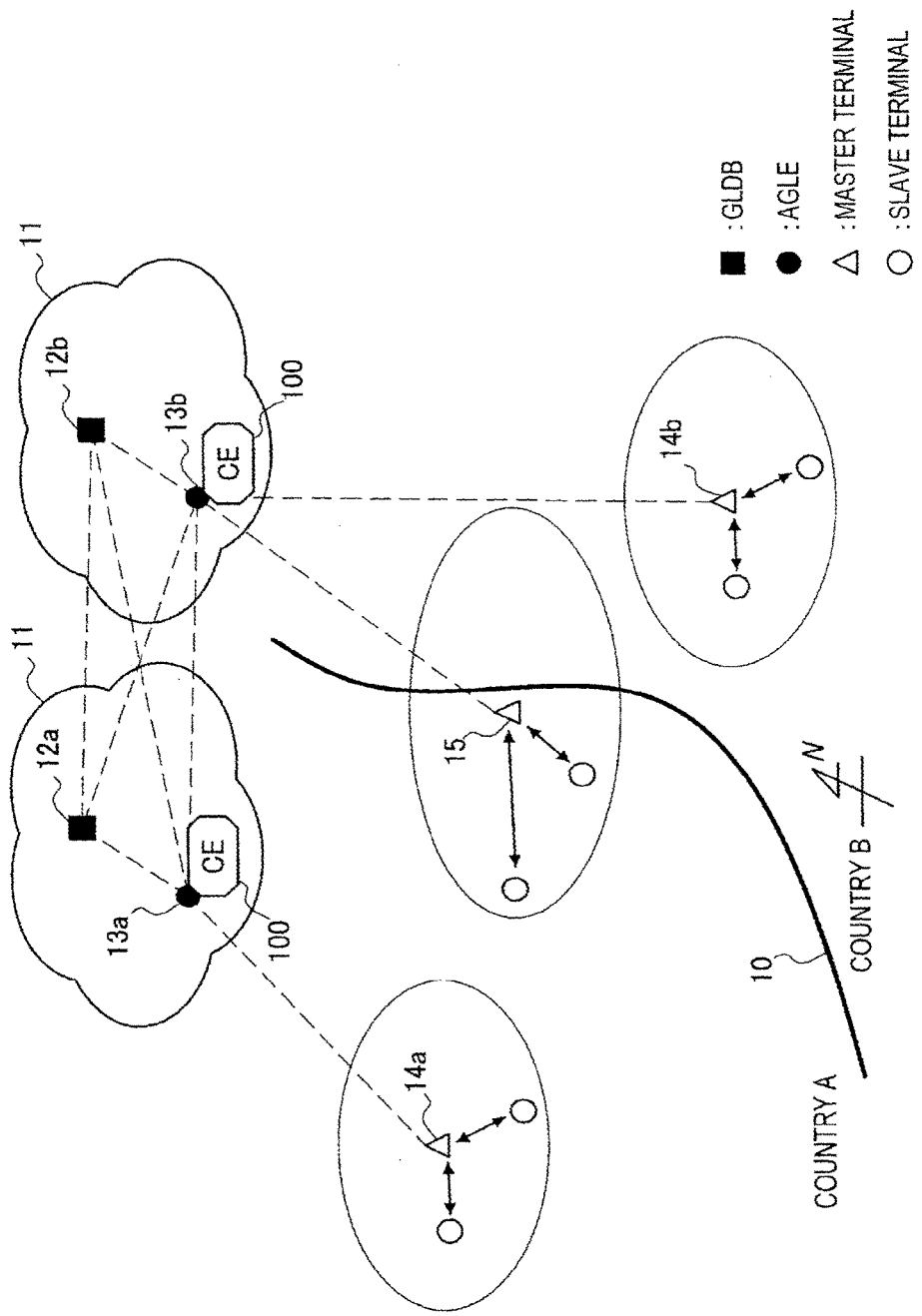
FIG. 6B is an explanatory diagram illustrating a second example of an arrangement of a control entity.

FIG. 6B is an explanatory diagram illustrating a second example of an arrangement of the control entity. In the second example of FIG. 6B, the control entities are arranged in the AGLEs 13a and 13b, respectively. The control entity is connected to the regulatory database in the same country and the regulatory database and the secondary system management node in the adjacent country in a communicable manner. For example, when the master terminal 15 starts operating the secondary system, the AGLE 13a itself executes the calculation of the protection ratio for the master terminal 15, and allocates the transmission power to the master terminal 15 by using the calculation result. The AGLE 13a may ask the AGLE 13b to calculate the protection ratio for the master terminal 15.

FIG. 6C is an explanatory diagram illustrating a third example of an arrangement of the control entity. In the third example of FIG. 6C, the control entities are arranged in the GLDBs 12a and 12b, respectively. The control entity is connected to the regulatory database in the same country, and the regulatory database and the secondary system management node in the adjacent country in a communicable manner. For example, when the master terminal 15 starts operating the secondary system, the calculation of the protection ratio for the master terminal 15 is executed by the GLDB 12a, and by using the calculation result, the transmission power is allocated to the master terminal 15 by the GLDB 12a or AGLE 13a. The GLDB 12a may ask the GLDB 12b to calculate the protection ratio for the master terminal 15.

[2-2. Configuration Example of Communication Control Apparatus]

Figure 7:
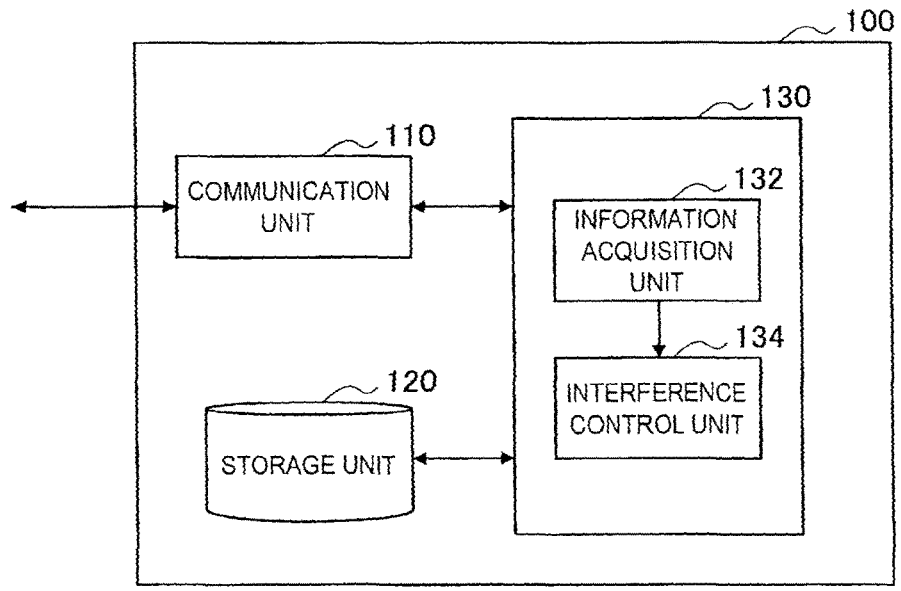
FIG. 7 is a block diagram illustrating an example of a configuration of a communication control apparatus according to an embodiment.

In this section, there will be described a configuration example of a communication control apparatus 100 in which the control entity described above is arranged. FIG. 7 is a block diagram illustrating an example of a configuration of the communication control apparatus 100 according to an embodiment. With reference to FIG. 7, the communication control apparatus 100 includes a communication unit 110, a storage unit 120, and a control unit 130.

(1) Communication Unit

The communication unit 110 is a module for communicating with another node by the communication control apparatus 100. The communication unit 110 may include a radio communication module including an antenna and a radio frequency (RF) circuit, or may include a wired communication module such as a local area network (LAN) connection terminal.

(2) Storage Unit

The storage unit 120 uses a storage medium such as a hard disk or a semiconductor memory to store a program and data for operating the communication control apparatus 100. For example, the storage unit 120 stores information acquired from various databases, control nodes and master terminals by an information acquisition unit 132 described later.

(3) Control Unit

The control unit 130 corresponds to a processor such as a central processing unit (CPU) or a digital signal processor (DSP). The control unit 130 allows the control entity to operate by executing the program stored in the storage unit 120 or another storage medium. In this embodiment, the control unit 130 includes an information acquisition unit 132 and an interference control unit 134.

(4) Information Acquisition Unit

The information acquisition unit 132 acquires information used for the calculation of the protection ratio by the interference control unit 134 described later. For example, the information acquisition unit 132 acquires channel arrangement information on the frequency channel on the interfering side from the GLDB managing the frequency channel on the interfering side, directly or via the AGLE. Further, the information acquisition unit 132 acquires channel arrangement information on the frequency channels on the interfered side from the GLDB managing the frequency channels on the interfered side, directly or via the AGLE. These GLDBs may be databases that can be operated by different frequency management bodies. Therefore, the combination of the frequency channel on the interfering side and the frequency channel on the interfered side are not always be the combination of the frequency channels obtained by the division according to one frequency division scheme. Therefore, the overlapped part can exist between these frequency channels. The channel arrangement information, typically, includes parameters for determining at least one of the bandwidth and the center frequency of each frequency channel. The parameters included in the channel arrangement information may indicate the bandwidth and the center frequency themselves, or may indicate a lower end frequency and an upper end frequency of the band. Further, the channel arrangement information may indicate an identifier and a channel number of the frequency division scheme.

Moreover, the information acquisition unit 132 acquires interfering side device information indicating transmission characteristics of the apparatus transmitting the interference signal (for example, the WSD). The interfering side device information indicates at least the ACLR. Further, the information acquisition unit 132 acquires interfered side device information indicating reception characteristics of the apparatus receiving the desired signal (for example, the primary system terminal). The interfered side device information indicates at least the ACS. Further, the information acquisition unit 132 acquires the protection ratio previously defined for the interference of the co-channel from the GLDB on the interfered side. The information acquisition unit 132 then outputs the acquired information to the interference control unit 134.

(5) Interference Control Unit

The interference control unit 134 determines the overlapping on the frequency axis between the frequency channel on the interfering side and the frequency channel on the interfered side on the basis of the channel arrangement information inputted from the information acquisition unit 132. The overlapping of these frequency channels can correspond to one of the overlapping relationships described using FIG. 4A to FIG. 4E. The interference control unit 134 then calculates the protection ratio for protecting the frequency channel on the interfered side from the interference according to the determined overlapping. More specifically, the interference control unit 134 determines, for example, the weights $w_1$, $w_2$ and $w_3$ included in the logarithmic term of the protection ratio calculation formula (5) according to the determined overlapping. Further, the interference control unit 134 determines the interference margin IM. Then, the interference control unit 134 can calculate the protection ratio $PR_{adj}$ by substituting the protection ratio $PR_{Co}$ for the interference of the co-channel, the weights $w_1$, $w_2$ and $w_3$, the ALCR indicated by the interfering side device information, the ACS indicated by the interfered side device information, and the interference margin IM, for Formula (5). The interference control unit 134 may reckon the interference margin IM different depending on how many of or which of the databases manages the frequency channel to be considered, into the calculation of the protection ratio $PR_{adj}$. Further, the interference control unit 134, when the plurality of interference signals exist, may calculate the individual protection ratio for each of the plurality of interference signals according to Formula (5), and then calculate the aggregate protection ratio according to Formula (6).

When the control entity is arranged on the node different from the GLDB and AGLE as shown in the example of FIG. 6A, the interference control unit 134 calculates the protection ratio for the secondary system according to a request from the GLDB or AGLE, and returns the calculation result. Then, the transmission power is allocated to the secondary system by the GLDB or AGLE without violating the calculated protection ratio. On the other hand, when the control entity is arranged on the same node as the GLDB or AGLE as shown in the example of FIG. 6B or FIG. 6C, the interference control unit 134 calculates the protection ratio for the secondary system, and then allocates the transmission power to the secondary system without violating the calculated protection ratio. The master terminal receives a value of the transmission power allocated in this manner, and uses the transmission power not exceeding the received value to operate the secondary system.

[2-3. Configuration Example of Master Terminal]

Figure 8:
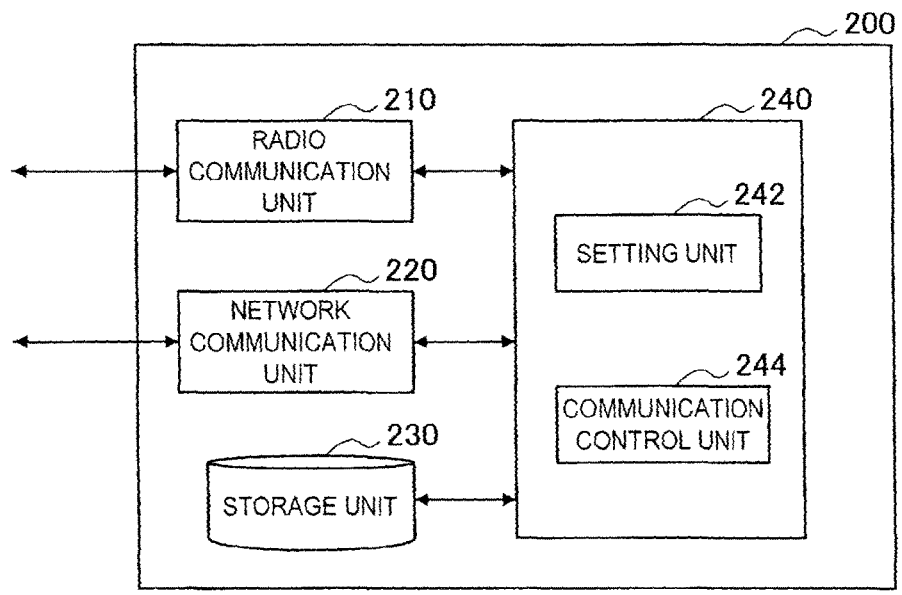
FIG. 8 is a block diagram illustrating an example of a configuration of a communication apparatus according to an embodiment.

FIG. 8 is a block diagram illustrating an example of a configuration of a master terminal 200 that uses the transmission power not violating the protection ratio calculated by the communication control apparatus 100 to perform radio communication. With reference to FIG. 8, the master terminal 200 includes a radio communication unit 210, a network communication unit 220, a storage unit 230, and a control unit 240.

(1) Radio Communication Unit

The radio communication unit 210 is a radio communication module for receiving/transmitting a radio signal from/to a slave terminal connected to the secondary system. The radio communication unit 210 includes an antenna and an RF circuit. The transmission power of the radio signal transmitted from the radio communication unit 210 can be controlled so that the interference to the primary system is suppressed in an allowable range, by using the protection ratio calculated by the communication control apparatus 100.

(2) Network Communication Unit

The network communication unit 220 is a communication module for communication between the master terminal 200 and the GLDB, AGLE or communication control apparatus 100. The network communication unit 220 may include a radio communication module that can be in common with the radio communication unit 210, or may include a wired communication module such as a LAN connection terminal.

(3) Storage Unit

The storage unit 230 uses a storage medium such as a hard disk or a semiconductor memory to store a program and data for operating the master terminal 200. For example, the storage unit 230 can store a transmission power value and other control information obtained by signaling from the GLDB, AGLE or communication control apparatus 100.

(4) Control Unit

The control unit 240 corresponds to a processor such as a CPU or DSP. The control unit 240 allows the master terminal 200 to operate various functions by executing the program stored in the storage unit 230 or another storage medium. In this embodiment, the control unit 240 has a setting unit 242, and a communication control unit 244.

(5) Setting Unit

The setting unit 242 sets communication parameters for radio communication with the slave terminal according to control information received by the network communication unit 220. For example, the setting unit 242 sets the channel designated in the control information as the frequency channel to be used in the secondary system. Further, the setting unit 242 sets the transmission power value obtained by signaling from the GLDB, AGLE or communication control apparatus 100, as a value of the maximum transmission power of the secondary system.

(6) Communication Control Unit

The communication control unit 244 controls the operation of the secondary system. For example, the communication control unit 244, when starting the operation of the secondary system, transmits a power allocation request to the GLDB, AGLE or communication control apparatus 100 via the network communication unit 220. The power allocation request can include device information indicating transmission characteristics of the radio signal of the master terminal 200 in addition to a device ID and position information of the master terminal 200. Note that the device information may be transmitted separately from the power allocation request. Further, the device information may be previously registered in any database. The device information can be used by the communication control apparatus 100 as the interfering side device information described above for the calculation of the protection ratio. When the frequency channel and transmission power for the secondary system is allocated according to the power allocation request, the communication control unit 244 allows the setting unit 242 to set the allocated frequency channel and transmission power. This enables the operation of the secondary system. Then, for example, the communication control unit 244 allocates a communication resource on the set frequency channel to each slave terminal, and distributes scheduling information to the slave terminal. Further, the communication control unit 244 allows the radio communication unit 210 to receive an uplink signal and transmit a downlink signal according to the scheduling information. The communication control unit 244 controls the transmission power so that the transmission power of these radio signals does not exceed the maximum transmission power set by the setting unit 242.

Note that the example that the master terminal 200 schedules the communication in the secondary system has been described here, but the technology according to the present disclosure is not limited to this example. For example, the secondary system may be operated by a collision avoidance system.

[2-4. Flow of Processing]

Figure 9:
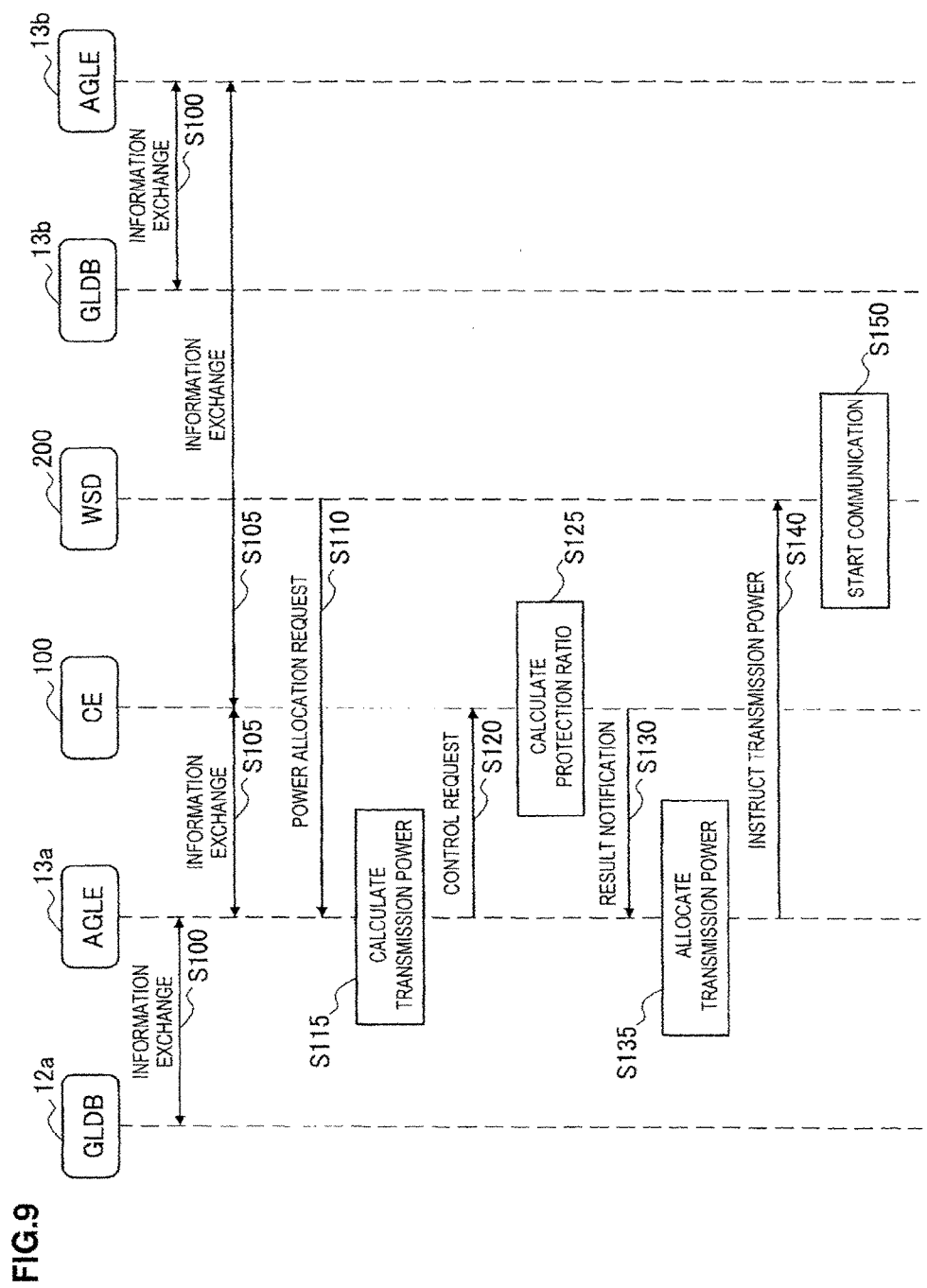
FIG. 9 is a sequence diagram illustrating an example of a flow of communication control processing according to an embodiment.

FIG. 9 is a sequence diagram illustrating an example of a flow of communication control processing according to this embodiment. As an example, the sequence diagram of FIG. 9 involves the GLDB 12a, the AGLE 13a, the communication control apparatus (CE) 100, the master terminal (WSD) 200, the GLDB 13b and the AGLE 13b. Here, the master terminal 200 is assumed to try to start operating the secondary system, and the AGLE 13a is assumed to allocate the transmission power to the master terminal 200.

First, the GLDB 12a and AGLE 13a exchange information periodically or according to a predetermined trigger. Similarly, the GLDB 12b and AGLE 13b exchange information periodically or according to a predetermined trigger (Step 100). The information exchanged here can include, for example, synchronization information (such as NTP information, time correction information), ID information, region information (such as a boundary position of the management region, and geographical information thereon), security information (such as a security key for mutual certification), signaling control information (such as an information update cycle, an information effective period, and backup related information), and secondary system control information (such as a list of frequency channels that can be used for the secondary usage, an allowable interference level, a protection ratio for the interference of the co-channel, and channel arrangement information and reception characteristics of the primary system).

Further, the communication control apparatus 100 and AGLE 13a exchange information periodically or according to a predetermined trigger. Similarly, the communication control apparatus 100 and AGLE 13b exchange information periodically or according to a predetermined trigger (step S105). The information exchanged here can include, for example, synchronization information, ID information, region information, security information, signaling control information, and secondary system control information.

The master terminal 200, when being positioned in the region managed by the GLDB 12a and AGLE 13a, transmits the power allocation request to the AGLE 13a in order to start operating the secondary system (Step S110). The master terminal 200 further transmits device information and system requirement information to the AGLE 13a. The device information transmitted here can include device information, a certification ID, position information, antenna information (such as a gain and a height), characteristic information (such as transmission characteristics, and reception characteristics), capability information (such as radio access technology (RAT), a receivable slave terminal count, a supported channel and outputtable power), and battery information. The system requirement information is information identifying requirements of the secondary system desired to be operated by the master terminal 200, and can include, for example, a desired bandwidth, a usage time band, a desired quality level.

The AGLE 13a, when the power allocation request is received from the master terminal 200, allocates one or more of the frequency channels that can be used for the secondary usage, to the master terminal 200, and provisionally calculates a value of the transmission power satisfying the requirements desired by the master terminal 200 (Step S115). Here, an effective period for the allocation may be set. Further, the AGLE 13a, when it is determined that the coverage of the secondary system is across the boundary of the management region on the basis of the position and the provisional transmission power value of the master terminal 200, transmits a control request to the communication control apparatus 100 (Step S120). The AGLE 13a may provide the communication control apparatus 100 with the (interfering side) channel arrangement information and the provisional transmission power value of the secondary system, together with the control request. Note that, when a dedicated frequency channel for the usage adjacent to the boundary of the management region is previously defined, the dedicated frequency channel may be used as a channel to be used by the secondary system.

The communication control apparatus 100, when the control request is received from the AGLE 13a, determines the overlapping on the frequency axis between the frequency channel on the interfering side and the frequency channel on the interfered side, and calculates the protection ratio for protecting the primary system from the interference according to the determined overlapping (Step S125). Note that the determination of whether the coverage of the secondary system is across the boundary may be executed by the communication control apparatus 100. The communication control apparatus 100 may reckon the interference margin different depending on how many of or which of the databases manages the frequency channel to be considered in the calculation of the protection ratio, into the calculation of the protection ratio. The communication control apparatus 100 then notifies the AGLE 13a of the calculation result of the protection ratio (Step S130). The AGLE 13a, when being notified of the calculation result of the protection ratio from the communication control apparatus 100, allocates the transmission power to the secondary system without violating the protection ratio in the notice (Step S135). The AGLE 13a then instructs the frequency channel to be used by the secondary system and the allocated transmission power value to the master terminal (Step S140).

The master terminal 200 uses the transmission power not exceeding the allocated power value on the frequency channel instructed from the AGLE 13a to start operating the secondary system (Step S150).

Note that the flow of the processing of FIG. 9 is merely an example. For example, when the control entity is arranged on the same node as the AGLE 13a, the signaling between the AGLE 13a and the communication control apparatus 100 may be omitted. Similarly, when the control entity is arranged on the same node as the AGLE 12a, the signaling between the AGLE 12a and the communication control apparatus 100 may be omitted. When the control entities are arranged on the different nodes, respectively, these control entities may calculate the protection ratio in a cooperated manner. Further, load distribution, processing assignment or the like may be performed among the plurality of control entities.

<3. Application Example>

[3-1. Arrangement of Control Entity]

Up to here, the embodiments in a context of the TV white space have been mainly described. However, the technology according to the present disclosure is not limited to such examples. For example, in the discussion of the fifth generation (5G) radio communication system after the 3GPP Release 12, it has been proposed that the macro cell and the small cell are made overlapped with each other in order to improve the communication capacity (NTT DOCOMO, INC., "Requirements, Candidate Solutions & Technology Roadmap for LTE Rel-12 Onward", 3GPP Workshop on Release 12 and onwards, Ljubljana, Slovenia, Jun. 11-12, 2012). Accordingly, the technology according to the present disclosure can be applied to the allocation of the transmission power to the small cell when the small cell secondarily uses the frequency band protected for the macro cell. Further, the technology according to the present disclosure can be also applied to the LSA based on infrastructure sharing. Further, the technology according to the present disclosure can be also applied to the interference control between a system operated by a mobile virtual network operator (MVNO) and a system operated by a mobile network operator (MNO). Which system or which cell is treated as the interfering side and which system or which cell is treated as the interfered side may be determined according to a priority for each communication link. The priority can be specified by QoS requirements or defined in advance.

Figure 10A:
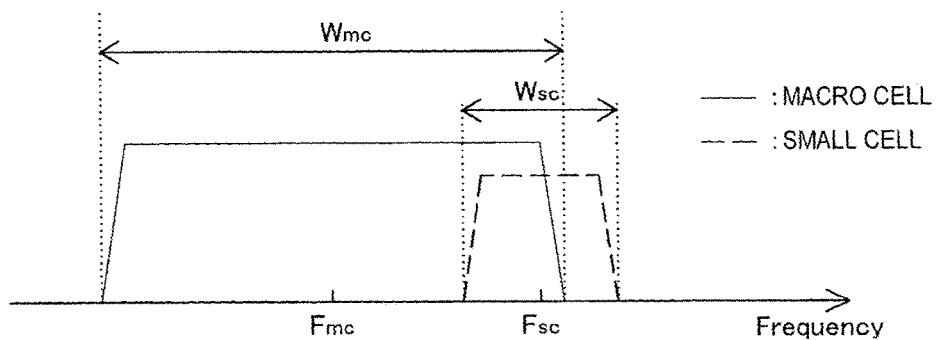
FIG. 10A is an explanatory diagram for explaining a first example of an overlapping relationship between a frequency channel of a macro cell and a frequency channel of a small cell.

FIG. 10A is an explanatory diagram for explaining a first example of the overlapping relationship between the frequency channel of the macro cell and the frequency channel of the small cell. The frequency channel of the small cell has a center frequency $F_{sc}$ and a bandwidth $W_{sc}$. The frequency channel of the macro cell has a center frequency $F_{mc}$ and a bandwidth $W_{mc}$. In the first example, the frequency channel of the small cell and the frequency channel of the macro cell are partially overlapped with each other. In this case, it is beneficial to determine the maximum transmission power of the small cell by using the protection ratio calculated similarly to the case described using FIG. 4C.

Figure 10B:
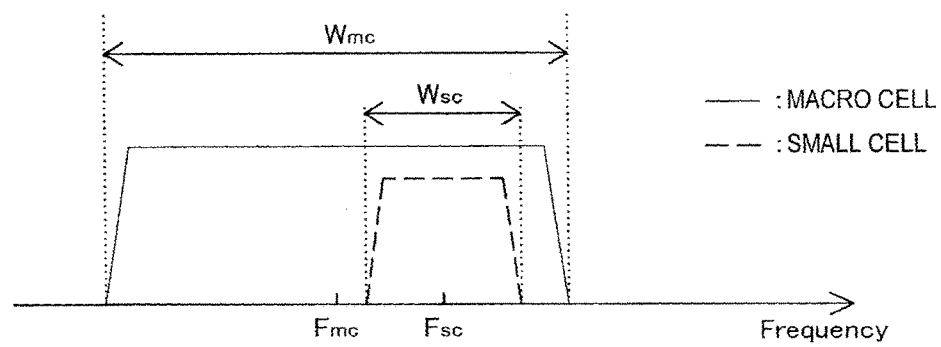
FIG. 10B is an explanatory diagram for explaining a second example of an overlapping relationship between a frequency channel of a macro cell and a frequency channel of a small cell.

FIG. 10B is an explanatory diagram for explaining a second example of the overlapping relationship between the frequency channel of the macro cell and the frequency channel of the small cell. In the second example, the frequency channel of the small cell is included by the frequency channel of the macro cell. In this case, it is beneficial to determine the maximum transmission power of the small cell by using the protection ratio calculated similarly to the case described using FIG. 4D.

Figure 10C:
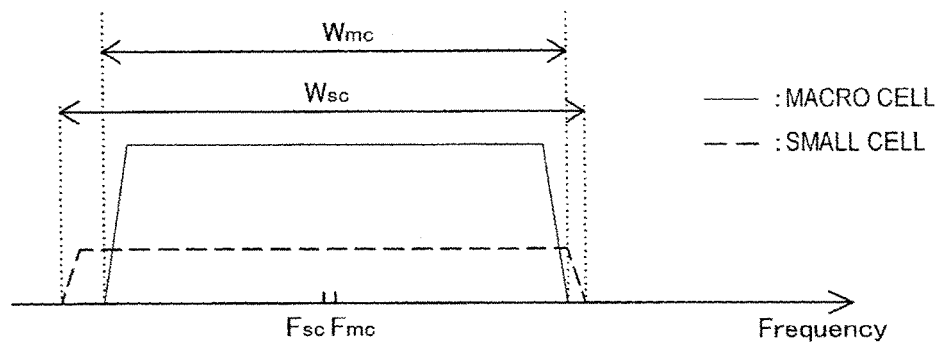
FIG. 10C is an explanatory diagram for explaining a third example of an overlapping relationship between a frequency channel of a macro cell and a frequency channel of a small cell.

FIG. 10C is an explanatory diagram for explaining a third example of the overlapping relationship between the frequency channel of the macro cell and the frequency channel of the small cell. In the third example, the frequency channel of the small cell includes the frequency channel of the macro cell. In this case, it is beneficial to determine the maximum transmission power of the small cell by using the protection ratio calculated similarly to the case described using FIG. 4B.

Figure 11:
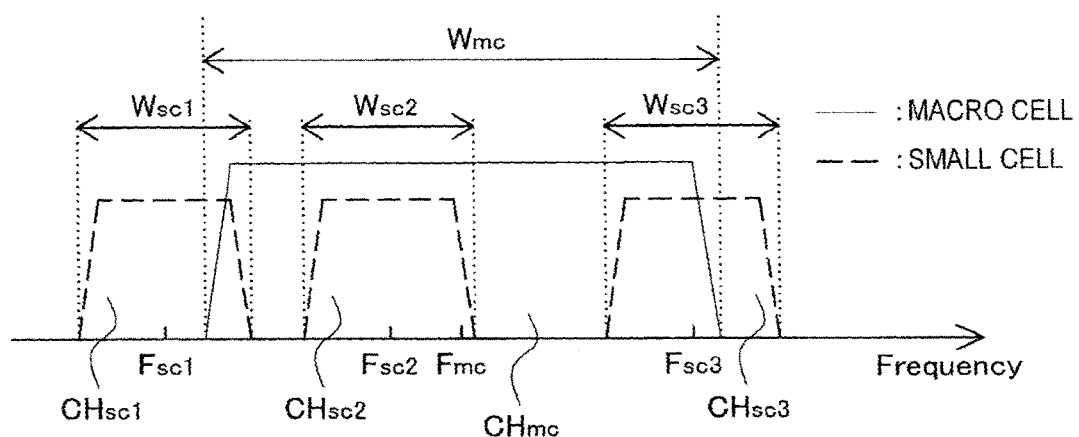
FIG. 11 is an explanatory diagram illustrating an example of a condition that a plurality of small cells exist.

FIG. 11 illustrates an example of a condition that a plurality of small cells exist. In the example of FIG. 11, a frequency channel $CH_{mc}$ of the macro cell has the center frequency $F_{mc}$, and the bandwidth $W_{mc}$. On the other hand, three small cells that may give the interference to the macro cell are operated on frequency channel $CH_{sc1}$, $CH_{sc2}$ and $CH_{sc3}$, respectively. The frequency channel $CH_{sc1}$ has a center frequency $F_{sc1}$ and a bandwidth $W_{sc1}$. The frequency channel $CH_{sc2}$ has a center frequency $F_{sc2}$ and a bandwidth $W_{sc2}$. The frequency channel $CH_{sc3}$ has a center frequency $F_{sc3}$ and a bandwidth $W_{sc3}$. The aggregate protection ratio for protecting the macro cell from the interference may be calculated by substituting the individual protection ratios provisionally calculated for the frequency channels of these small cells, for Formula (6).

FIG. 12A to FIG. 12E illustrate some examples of the arrangement of the control entity when the control entity described above is installed for the interference control between the small cell and the macro cell. Here, as an example, the macro cell is assumed to be operated according to a long term evolution (LTE)-based cellular communication system, and a macro cell base station is assumed to be connected to a core network implemented as an evolved packet core (EPC). The respective nodes in the drawing act as follows. Note that only the representative nodes are illustrated here, but other kinds of nodes may be also included in the radio communication system.

Home subscriber server (HSS): a server that manages identification information, profile information and certification information of a subscriber.

Mobility management entity (MME): an entity that transmits/receives a non access stratum (NAS) signal to/from a UE, and performs mobility management, session management and paging, and is connected to a plurality of eNBs.

PDN-gateway (P-GW): a gateway that is positioned at a connection point between an EPC and a PDN, and performs allocation of an IP address to the UE, and adding and deleting of an IP header.

Serving-gateway (S-GW): a gateway that is positioned between an E-UTRAN and the EPC, and performs routing of a packet of a user plain.

Evolved node B (eNB): a base station that realizes a radio link within the macro cell, and performs radio resource management (RRM), a radio bearer control and scheduling.

Small-cell base station (SBS): a base station that operates the small cell

Control entity (CE): an entity that calculates the protection ratio for protecting the macro cell from the interference, and here also performs the allocation of the transmission power to the small cell based on the calculated protection ratio.

Figure 12A:
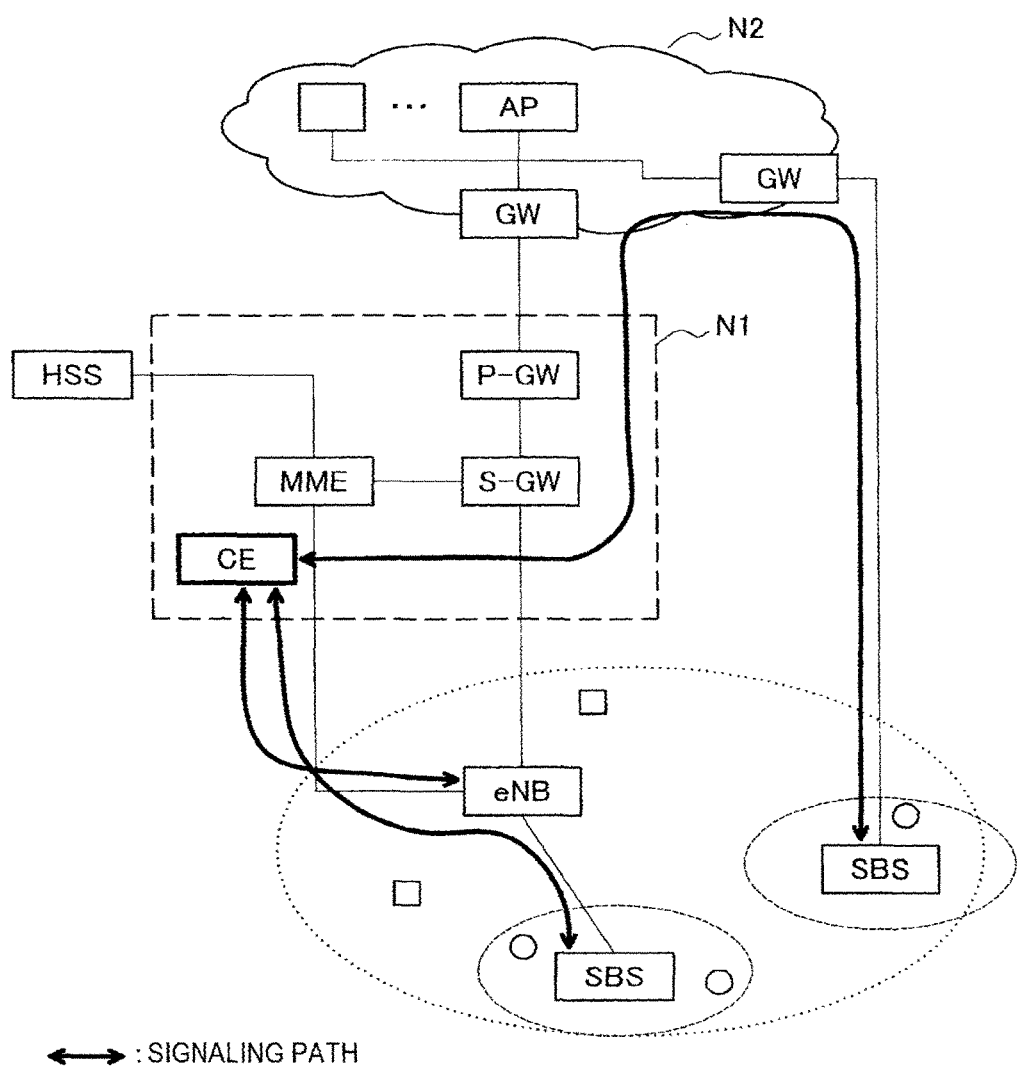
FIG. 12A is an explanatory diagram illustrating a first example of an arrangement of the control entity in an application example.
Figure 12B:
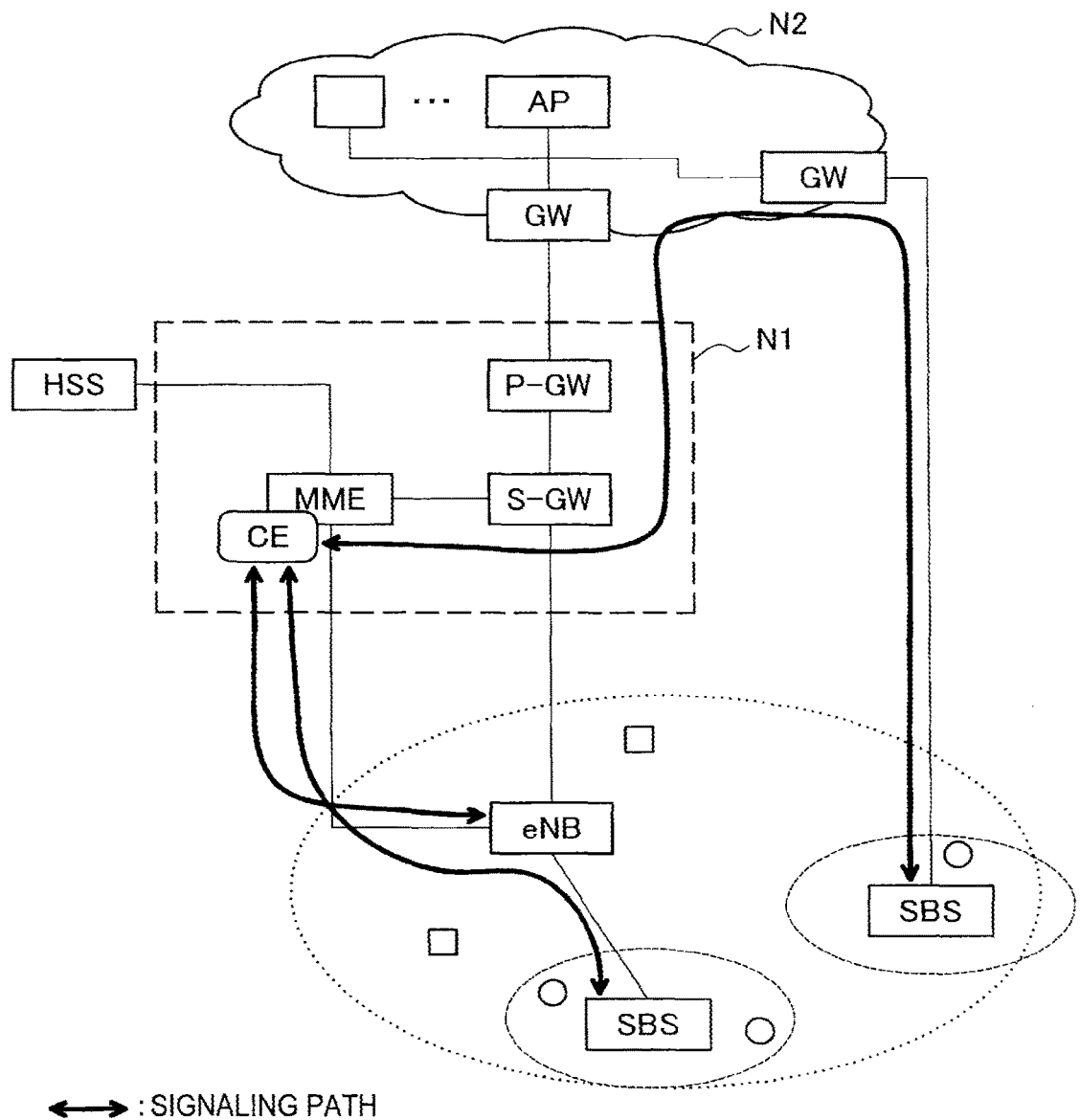
FIG. 12B is an explanatory diagram illustrating a second example of an arrangement of the control entity in an application example.
Figure 12C:
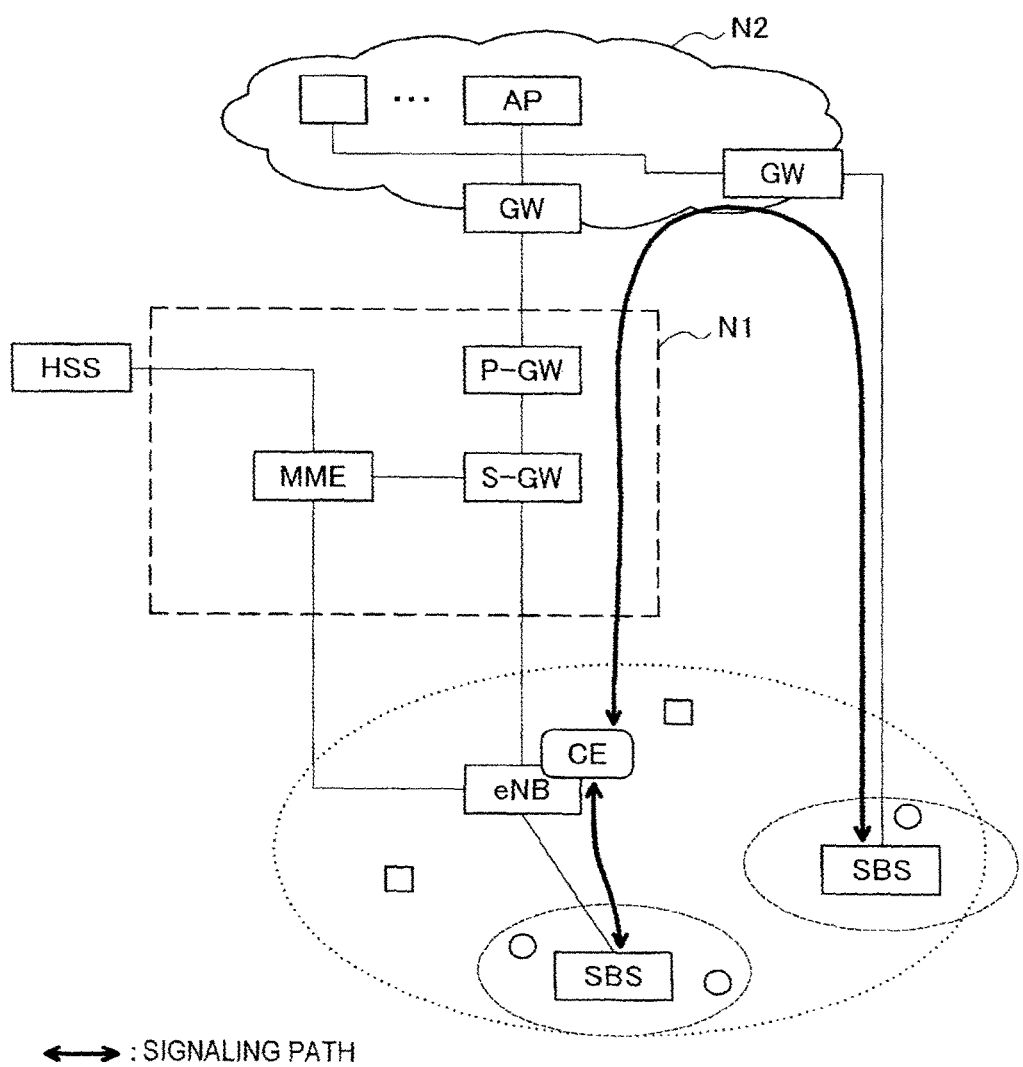
FIG. 12C is an explanatory diagram illustrating a third example of an arrangement of the control entity in an application example.
Figure 12D:
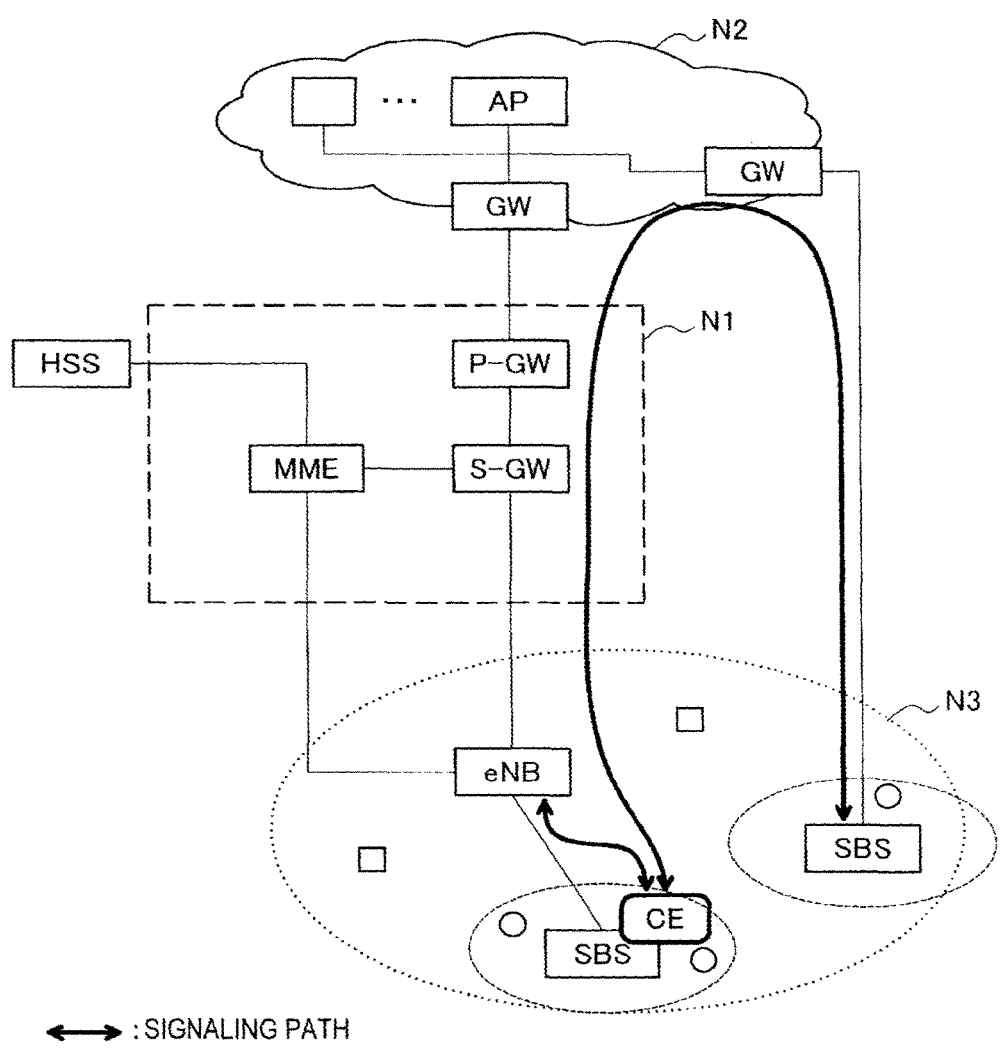
FIG. 12D is an explanatory diagram illustrating a fourth example of an arrangement of the control entity in an application example.
Figure 12E:
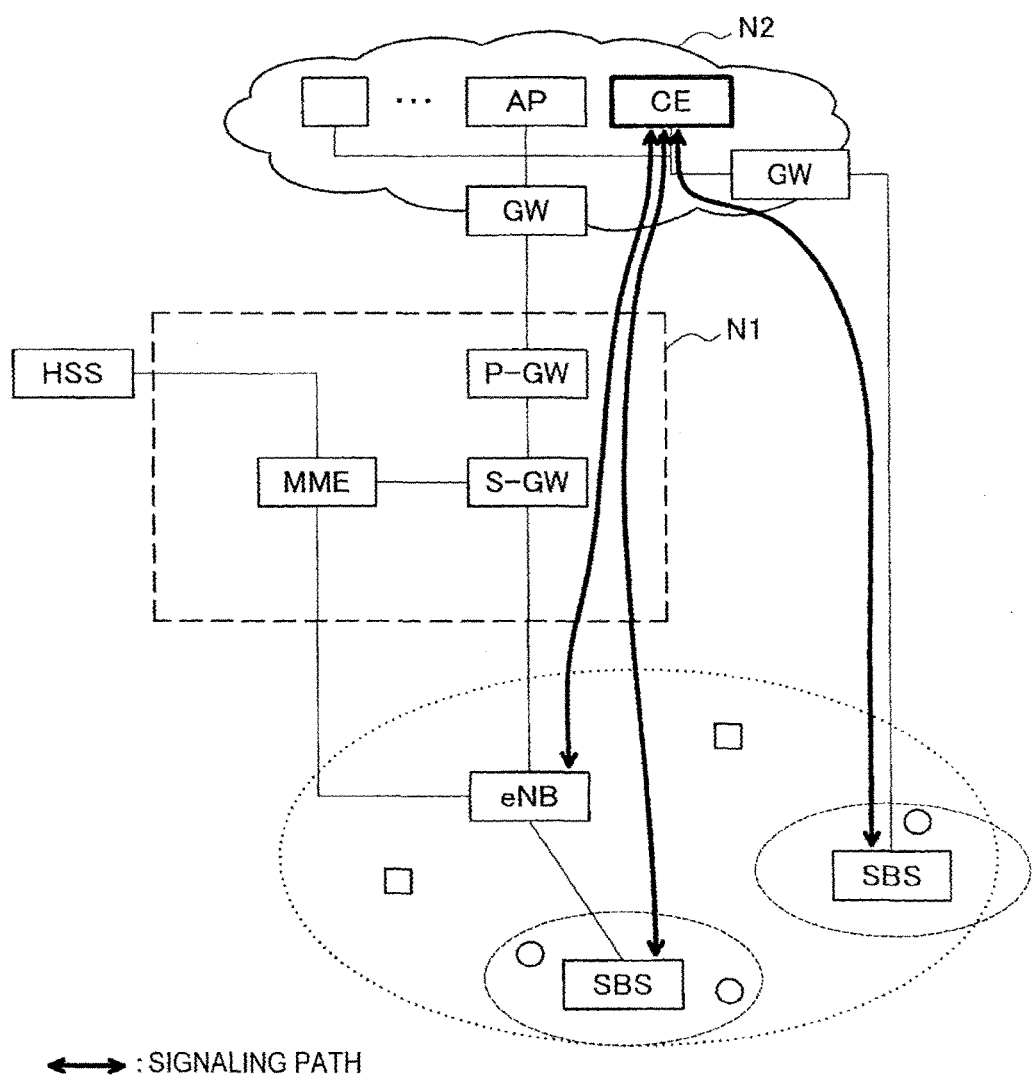
FIG. 12E is an explanatory diagram illustrating a fifth example of an arrangement of the control entity in an application example.

In the example of FIG. 12A, the control entity is arranged as a new control entity within a core network N1. In this case, signaling between the control entity and the small cell base station may be performed via an external network N2 such as the Internet, or may be performed via a macro cell base station (eNB). In the example of FIG. 12B, the control entity is arranged as a new function on the control node (for example, the MME) within the core network N1. In the example of FIG. 12C, the control entity is arranged as a new function on the base station (eNB) of the macro cell. In this case, signaling between the control entity and the small cell base station may be performed via the core network N1 and the external network N2, or may be performed on an X2 interface between the base stations. In the example of FIG. 12D, the control entity is arranged as a new function on the small cell base station. In this case, signaling between the control entity and the small cell base station may be performed via a radio access network N3, the core network N1 and the external network N2, or may be performed on the X2 interface between the base stations. In the example of FIG. 12E, the control entity is arranged as a new server apparatus within the external network N2. In this case, signaling between the control entity and the small cell base station may be performed via the external network N2, or may be performed via the core network N1.

[3-2. Application to Various Products]

The technology of the present disclosure is applicable to various products. For example, the communication control apparatus 100 may be realized as any type of server such as a tower server, a rack server, and a blade server. The communication control apparatus 100 may be a control module (such as an integrated circuit module including a single die, and a card or a blade that is inserted into a slot of a blade server) mounted on a server.

For example, the control entity may be mounted on any type of evolved Node B (eNB) such as a macro eNB, and a small eNB. The small eNB may be an eNB that covers a cell smaller than a macro cell, such as a pico eNB, micro eNB, or home (femto) eNB. Instead, the control entity may be mounted on other types of base stations such as a NodeB and a base transceiver station (BTS). The eNB may include a main body (that is also referred to as a base station apparatus) configured to control radio communication, and one or more remote radio heads (RRH) disposed in a different place from that of the main body.

For example, the master terminal 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The master terminal 200 may also be realized as a terminal (that is also referred to as a machine type communication (MTC) terminal) that performs machine-to-machine (M2M) communication. Furthermore, a radio communication module (such as an integrated circuit module including a single die) mounted on each of the terminals may be provided.

(1) Application Example Related to Control Node

Figure 13:
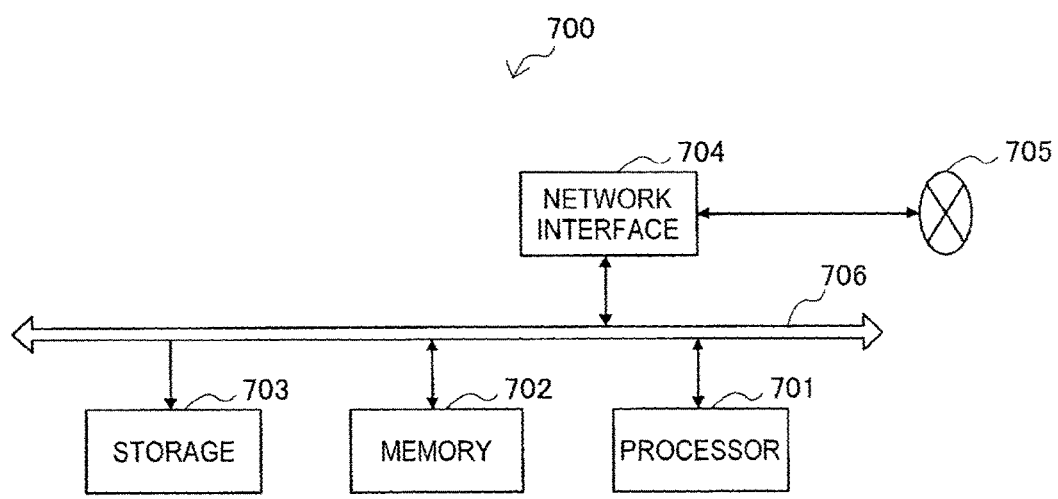
FIG. 13 is a block diagram illustrating an example of a schematic configuration of a server.

FIG. 13 is a block diagram illustrating an example of the schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes a random access memory (RAM) and a read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an evolved packet core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 shown in FIG. 13, the information acquisition unit 132 and the interference control unit 134 described using FIG. 7 may be implemented in the processor 701. For example, when the server 700 calculates the protection ratio according to the system described above, it is possible to protect the frequency channel on the interfered side from the interference even in a state where the frequency channels are partially overlapped.

(2) Application Examples Related to Base Station

Figure 14:
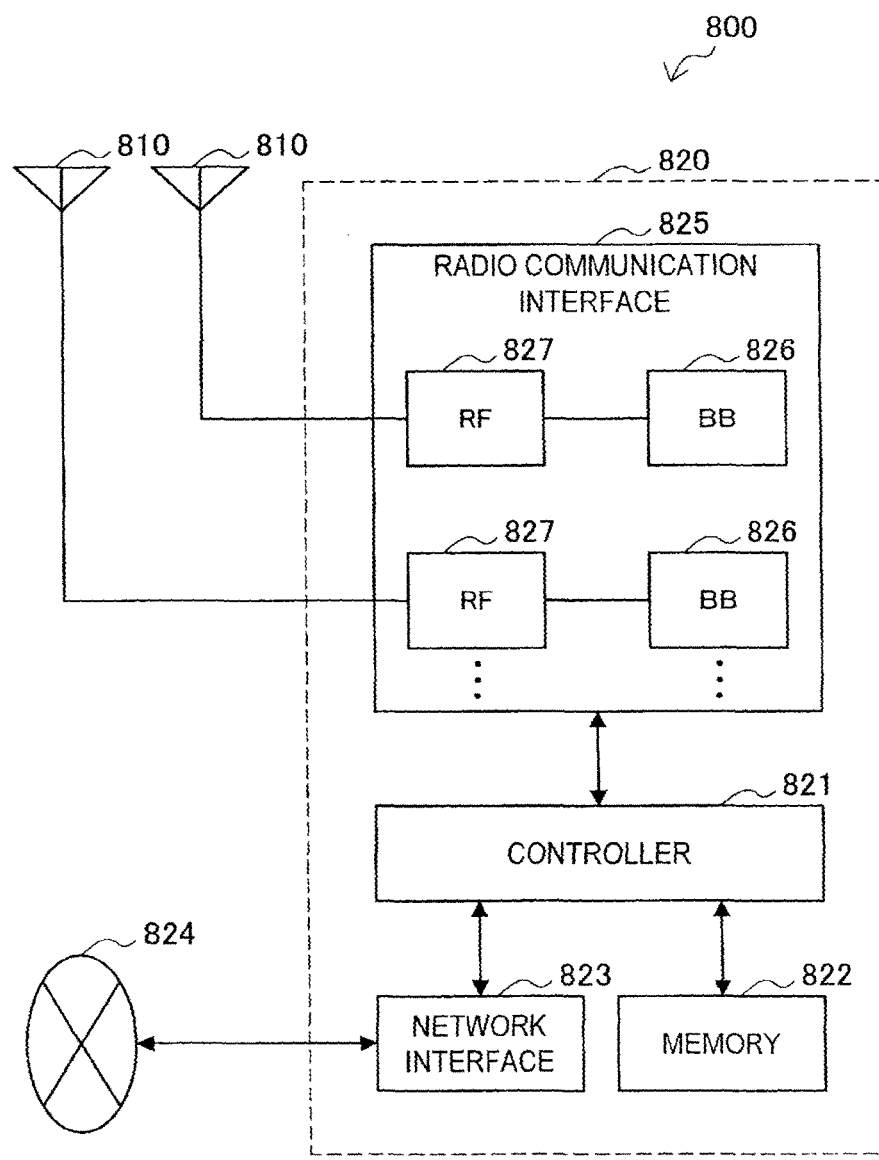
FIG. 14 is a block diagram illustrating an example of a schematic configuration of an eNB.

FIG. 14 is a block diagram illustrating an example of the schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 14. For example, the multiple antennas 810 may be compatible with multiple frequency bands used by the eNB 800, respectively. Note that FIG. 14 illustrates the example in which the eNB 800 includes the multiple antennas 810, but the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes a RAM and a ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as long term evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 14. For example, the multiple BB processors 826 may be compatible with multiple frequency bands used by the eNB 800. The radio communication interface 825 may include the multiple RF circuits 827, as illustrated in FIG. 14. For example, the multiple RF circuits 827 may be compatible with multiple antenna elements, respectively. Note that FIG. 14 illustrates the example in which the radio communication interface 825 includes the multiple BB processors 826 and the multiple RF circuits 827, but the radio communication interface 825 may also include a single BB processor 826 or a single RF circuit 827.

In the eNB 800 shown in FIG. 14, the information acquisition unit 132 and the interference control unit 134 described using FIG. 7 may be implemented in, for example, the controller 821. For example, when the eNB 800 calculates the protection ratio according to the system described above, it is possible to protect the frequency channel on the interfered side from the interference even in a state where the frequency channels are partially overlapped.

(3) First Application Example Related to Terminal Apparatus

Figure 15:
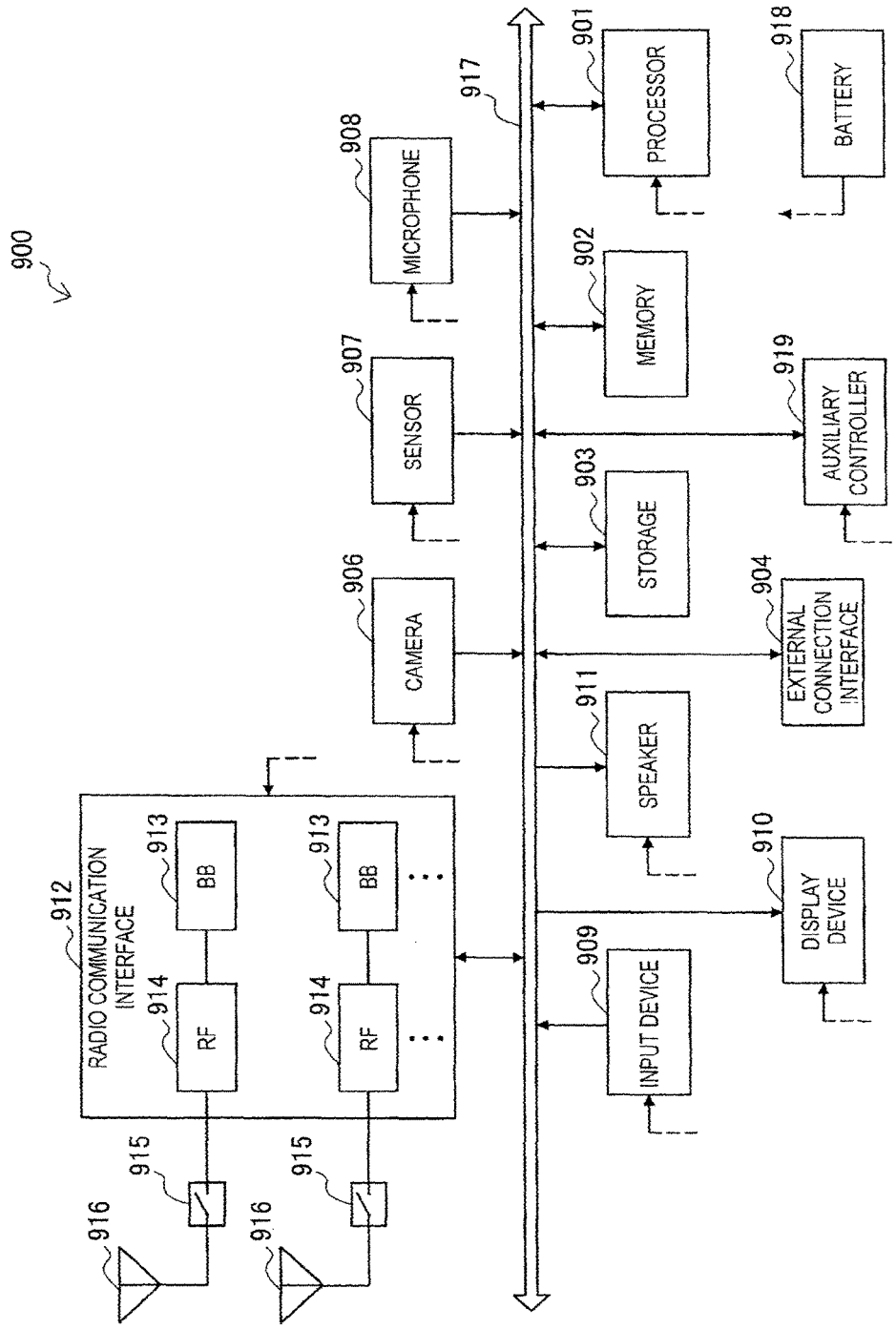
FIG. 15 is a block diagram illustrating an example of a schematic configuration of a smartphone.

FIG. 15 is a block diagram illustrating an example of the schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and another layer of the smartphone 900. The memory 902 includes a RAM and a ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 15. Note that FIG. 15 illustrates the example in which the radio communication interface 912 includes the multiple BB processors 913 and the multiple RF circuits 914, but the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 15. Note that FIG. 15 illustrates the example in which the smartphone 900 includes the multiple antennas 916, but the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 15 via feeder lines, which are partially shown as dashed lines in the figure. The auxiliary controller 919 operates a minimum necessary function of the smartphone 900, for example, in a sleep mode.

In the smartphone 900 shown in FIG. 15, the setting unit 242 and the communication unit 244 described using FIG. 8 may be implemented in the radio communication interface 912. Further, at least a part of these functions may be implemented in the processor 901 and the auxiliary controller 919. For example, when the smartphone 900 uses the transmission power not violating the protection ratio calculated by the control entity described above, it is possible to properly protect the frequency channel on the interfered side from the interference.

(4) Second Application Example Related to Terminal Apparatus

FIG. 16 is a block diagram illustrating an example of the schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes a RAM and a ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sound of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 16. Note that FIG. 16 illustrates the example in which the radio communication interface 933 includes the multiple BB processors 934 and the multiple RF circuits 935, but the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 16. Note that FIG. 16 illustrates the example in which the car navigation apparatus 920 includes the multiple antennas 937, but the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 16 via feeder lines that are partially shown as dashed lines in the figure. The battery 938 accumulates power supplied form the vehicle.

In the car navigation apparatus 920 shown in FIG. 16, the setting unit 242 and the communication unit 244 described using FIG. 8 may be implemented in the radio communication interface 933. Further, at least a part of these functions may be implemented in the processor 921. For example, when the car navigation apparatus 920 uses the transmission power not violating the protection ratio calculated by the control entity described above, it is possible to properly protect the frequency channel on the interfered side from the interference.

The technology of the present disclosure may also be realized as an in-vehicle system (or a vehicle) 940 including one or more blocks of the car navigation apparatus 920, the in-vehicle network 941, and a vehicle-side module 942. The vehicle-side module 942 generates vehicle data such as vehicle speed, engine speed, and trouble information, and outputs the generated data to the in-vehicle network 941.

<4. Summary>

Up to here, by using FIG. 2 to FIG. 16, some embodiments of the technology according to the present disclosure have been described in detail. According to the embodiments described above, when the frequency channel on which the interference signal is transmitted and the frequency channel on which the desired signal is transmitted can be partially overlapped with each other, the protection ratio for protecting the frequency channel on the interfered side is calculated on the basis of how these frequency channels are overlapped with each other on the frequency axis. Therefore, in a case of the interference which the existing method could not have handled, it is possible to more properly control the power of the interference signal.

Moreover, according to the embodiments described above, the overlapping between the frequency channels are determined from the bandwidths and center frequencies of the frequency channel on the interfering side and the frequency channel on the interfered side. Then, the weights included in the calculation formula of the protection ratio are determined according to the overlapping between the frequency channels. Therefore, the protection ratio can be flexibly changed for the various combinations of the frequency channels obtained by the division according to different frequency division schemes. For example, this makes it possible to optimize the allocation of the transmission power to the secondary system around the boundary of counties or regions having different frequency management bodies. Further, in such a radio communication environment that the macro cell and the small cell concurrently exist, this makes it possible to flexibly allocate the frequency channel to the small cell while properly protecting the macro cell.

Furthermore, according to the embodiments described above, the protection ratio includes the component corresponding to the interference of the co-channel, the component corresponding to the transmission characteristics of the apparatus transmitting the interference signal, and the component corresponding to the reception characteristics of the apparatus receiving the desired signal, and the weights among these components are adjusted according to the overlapping between the frequency channels. For example, in the calculation of the protection ratio, when the bandwidth on the interfering side is dominant, such adjustment that the transmission characteristics on the interfering side more contributes can be made, or when the bandwidth on the interfered side is dominant, such adjustment that the reception characteristics on the interfered side more contributes can be made. Therefore, in various scenarios such as the secondary usage of the TV white space, the heterogeneous network, the infrastructure sharing, and the coexistence with the MNO and the MVNNO, it is possible to reflect the characteristics of the device and the arrangement of the channels involved in each scenario to the calculation of the protection ratio.

Furthermore, according to the embodiments described above, when the plurality of interference signals exist, the aggregate protection ratio can be calculated from the individual protection ratio calculated for each of the plurality of interference signals. Therefore, the technology according to the present disclosure can be also applied to a case where the relationship between the interfering side and the interfered side is not in a one-to-one state. Further, the technology according to the present disclosure can be also applied to a case where the frequency hopping technology is used.

Furthermore, according to the embodiments described above, the interference margin determined depending on how many of or which of the databases manages the frequency channel considered in the calculation of the protection ratio is reckoned into the calculation of the protection ratio. Therefore, for example, while the harmful interference is securely avoided by increasing the interference margin in such a region that the management region by the frequency management body is complicated, the capacity of the secondary system can be positively enhanced by suppressing the interference margin in a region other than such a region.

Note that the series of control processing by the respective apparatuses described herein may be implemented by using any of software, hardware, and a combination of software and hardware. Programs constituting the software are previously stored in, for example, storage media (non-transitory media) provided in the inside or the outside of the respective apparatuses. And the respective programs are, for example, read into a random access memory (RAM) during execution and executed by the processor such as the CPU.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the technology according to the present disclosure may also be configured as below.

(1) A communication control apparatus including:

an information acquisition unit that acquires channel arrangement information for a first frequency channel on which an interference signal is transmitted and a second frequency channel on which a desired signal to be interfered from the interference signal is transmitted, the first frequency channel and the second frequency channel being a combination of frequency channels that can be partially overlapped with each other; and an interference control unit that determines overlapping on a frequency axis between the first frequency channel and the second frequency channel on the basis of the channel arrangement information, and calculates a protection ratio for protecting the second frequency channel from interference according to the determined overlapping.

(2) The communication control apparatus according to (1),
wherein the channel arrangement information includes a parameter for determining at least one of a bandwidth and a center frequency of each frequency channel.

(3) The communication control apparatus according to (1) or (2),
wherein the protection ratio is calculated by using a calculation formula including a first term corresponding to interference of a co-channel, a second term corresponding to a transmission characteristic of an apparatus that transmits the interference signal, and a third term corresponding to a reception characteristic of an apparatus that receives the desired signal, and
wherein weights of the first term, the second term and the third term are determined according to the overlapping between the first frequency channel and the second frequency channel.

(4) The communication control apparatus according to (3),
wherein the interference control unit determines the weights of the first term, the second term and the third term on the basis of a first bandwidth of an overlapping part between the first frequency channel and the second frequency channel, a second bandwidth obtained by subtracting the first bandwidth from a bandwidth of the second frequency channel, and a third bandwidth obtained by subtracting the first bandwidth from a bandwidth of the first frequency channel.

(5) The communication control apparatus according to (4),
wherein the calculation formula is expressed as follows:

$$PR_{adj} = PR_{Co} + 10 \log(w_1 + w_2 10^{-ACLR/10} + w_3 10^{-ACS/10} + IM) \quad [\text{Math. 11}]$$

where $PR_{adj}$ represents the protection ratio to be calculated, $PR_{co}$ represents a protection ratio defined for transmission on the co-channel, ACLR represents the transmission characteristic, ACS represents the reception characteristic, IM represents an interference margin of zero or non-zero, and w1, w2 and w3 represent the weights of the first term, the second term and the third term, respectively.

(6) The communication control apparatus according to any one of (1) to (5),
wherein the interference control unit, when a plurality of interference signals interfering with the desired signal exist, calculates an individual protection ratio for each of the plurality of interference signals according to the overlapping, and calculates an aggregate protection ratio by aggregating the calculated individual protection ratios.

(7) The communication control apparatus according to one of (1) to (6),
wherein the interference control unit reckons an interference margin determined depending on how many of or which of databases manages the frequency channel considered in the calculation of the protection ratio, into the calculation of the protection ratio.

(8) The communication control apparatus according to one of (1) to (7),
wherein the information acquisition unit acquires the channel arrangement information on the first frequency channel from a first database, and acquires the channel arrangement information on the second frequency channel from a second database operated by a frequency management body different from a frequency management body of the first database.

(9) The communication control apparatus according to one of (1) to (7),
wherein the first frequency channel is allocated to a small cell transmitting the interference signal, and the second frequency channel is allocated to a macro cell transmitting the desired signal.

(10) The communication control apparatus according to (6),
wherein the plurality of interference signals are a plurality of radio signals that are transmitted from a plurality of apparatuses to which frequency channels different from each other are allocated, respectively.

(11) The communication control apparatus according to (6),
wherein the plurality of interference signals are a plurality of radio signals that are transmitted from a single apparatus by using frequency hopping technology.

(12) A communication control method executed by a communication control apparatus, the communication control method including:
acquiring channel arrangement information for a first frequency channel on which an interference signal is transmitted and a second frequency channel on which a desired signal to be interfered from the interference signal is transmitted, the first frequency channel and the second frequency channel being a combination of frequency channels that can be partially overlapped with each other;
determining overlapping on a frequency axis between the first frequency channel and the second frequency channel on the basis of the channel arrangement information; and
calculating a protection ratio for protecting the second frequency channel from interference according to the determined overlapping.

(13) A radio communication apparatus including:
a communication unit that communicates with a communication control apparatus that calculates, according to overlapping on a frequency axis between a first frequency channel and a second frequency channel, the overlapping being determined based on channel arrangement information for the first frequency channel on which an interference signal is transmitted and the second frequency channel on which a desired signal to be interfered from the interference signal is transmitted, the first frequency channel and the second frequency channel being a combination of frequency channels that can be partially overlapped with each other, a protection ratio for protecting the second frequency channel from interference; and
a communication control unit that transmits information indicating a transmission characteristic of a radio signal of the radio communication apparatus itself to the communication control apparatus via the communication unit, and uses transmission power not violating the protection ratio calculated using the transmission characteristic by the communication control apparatus to perform radio communication on the first frequency channel.

REFERENCE SIGNS LIST 100 communication control apparatus
110 communication unit
120 storage unit
132 information acquisition unit
134 interference control unit
200 radio communication apparatus (master terminal)
210 radio communication unit
220 network communication unit
230 storage unit
242 setting unit
244 communication control unit

The invention claimed is:

1. A communication control apparatus comprising:
circuitry configured to
acquire channel arrangement information for a first frequency channel on which an interference signal is transmitted and a second frequency channel on which a desired signal to be interfered from the interference signal is transmitted, the first frequency channel and the second frequency channel being a combination of frequency channels partially overlappable with each other, and
determine an overlapping relationship between the first frequency channel and the second frequency channel based on the channel arrangement information, and
calculate an interference from the first frequency channel to the second frequency channel,
wherein the channel arrangement information includes at least one of bandwidth information of interfering side channel, bandwidth information of interfered side channel, or bandwidth of overlapping portion between the interfering side channel and the interfered side channel.

2. The communication control apparatus according to claim 1,
wherein the channel arrangement information includes a parameter for determining at least one of a bandwidth and a center frequency of each frequency channel.

3. The communication control apparatus according to claim 1,
wherein the interference is calculated by using a calculation formula including a first term corresponding to interference of a co-channel, a second term corresponding to a transmission characteristic of an apparatus that transmits the interference signal, and a third term corresponding to a reception characteristic of an apparatus that receives the desired signal, and
wherein weights of the first term, the second term and the third term are determined according to the overlapping relationship between the first frequency channel and the second frequency channel.

4. The communication control apparatus according to claim 3,
wherein the circuitry is further configured to determine the weights of the first term, the second term and the third term based on a first bandwidth of an overlapping part between the first frequency channel and the second frequency channel, a second bandwidth obtained by subtracting the first bandwidth from a bandwidth of the second frequency channel, and a third bandwidth obtained by subtracting the first bandwidth from a bandwidth of the first frequency channel.

5. The communication control apparatus according to claim 4,
wherein the calculation formula is expressed as follows:

$$PR_{adj} = PR_{Co} + 10 \log(w_1 + w_2 10^{-ACLR/10} + w_3 10^{-ACS/10} + IM)$$

where PRadj represents the interference to be calculated, PRco represents an interference defined for transmission on the co-channel, ACLR represents the transmission characteristic, ACS represents the reception characteristic, IM represents an interference margin of zero or non-zero, and w1, w2 and w3 represent the weights of the first term, the second term and the third term, respectively.

6. The communication control apparatus according to claim 1,
wherein when a plurality of interference signals interfering with e desired signal exist, the circuitry is further configured to
calculate an individual protection ratio for each of the plurality of interference signals according to overlapping relationships between the desired signal and the interference signals, and
calculate an aggregate protection ratio by aggregating the calculated individual protection ratios.

7. The communication control apparatus according to claim 1,
wherein the circuitry is further configured to reckon an interference margin determined depending on how many databases manage the frequency channel considered in the calculation of the interference or which of the databases manages the frequency channel considered in the calculation of the interference, into the calculation of the interference.

8. The communication control apparatus according to claim 1,
wherein the circuitry is further configured to
acquire the channel arrangement information on the first frequency channel from a first database, and
acquire the channel arrangement information on the second frequency channel from a second database operated by a frequency management body different from a frequency management body of the first database.

9. The communication control apparatus according to claim 1,
wherein the first frequency channel is allocated to a small cell transmitting the interference signal, and the second frequency channel is allocated to a macro cell transmitting the desired signal.

10. The communication control apparatus according to claim 6,
wherein the plurality of interference signals are a plurality of radio signals that are transmitted from a plurality of apparatuses to which frequency channels different from each other are allocated, respectively.

11. The communication control apparatus according to claim 6,
wherein the plurality of interference signals are a plurality of radio signals that are transmitted from a single apparatus by using frequency hopping technology.

12. The communication control apparatus according to claim 1, wherein the circuitry is further configured to calculate at least two weights of
a transmission characteristic of an apparatus that transmits the interference signal, and
a reception characteristic of an apparatus that receives the desired signal based on the channel arrangement information.

13. A communication control method executed by a communication control apparatus, the communication control method comprising:
acquiring channel arrangement information for a first frequency channel on which an interference signal is transmitted and a second frequency channel on which a desired signal to be interfered from the interference signal is transmitted, the first frequency channel and the second frequency channel being a combination of frequency channels partially overlappable with each other;

determining an overlapping relationship between the first frequency channel and the second frequency channel based on the channel arrangement information; and calculating an interference from the first frequency channel to the second frequency channel, the channel arrangement information including at least one of bandwidth information of interfering side channel, bandwidth information of interfered side channel, or bandwidth of overlapping portion between the interfering side channel and the interfered side channel.

14. The communication control method according to claim 13, further comprising calculating at least two weights of a transmission characteristic of an apparatus that transmits the interference signal, and a reception characteristic of an apparatus that receives the desired signal, based on the channel arrangement information.

15. The communication control method according to claim 13, wherein the channel arrangement information includes a parameter for determining at least one of a bandwidth and a center frequency of each frequency channel.

16. The communication control method according to claim 13, further comprising:

calculating the interference by using a calculation formula including a first term corresponding to interference of a co-channel, a second term corresponding to a transmission characteristic of an apparatus that transmits the interference signal, and a third term corresponding to a reception characteristic of an apparatus that receives the desired signal; and determining weights of the first term, the second term and the third term according to the overlapping relationship between the first frequency channel and the second frequency channel.

17. The communication control method according to claim 16, further comprising:

determining the weights of the first term, the second term and the third term based on a first bandwidth of an overlapping part between the first frequency channel and the second frequency channel, a second bandwidth obtained by subtracting the first bandwidth from a bandwidth of the second frequency channel, and a third bandwidth obtained by subtracting the first bandwidth from a bandwidth of the first frequency channel.

18. A communication control apparatus comprising:

circuitry configured to acquire channel arrangement information for a first frequency channel on which an interference signal is transmitted and a second frequency channel on which a desired signal to be interfered from the interference signal is transmitted, the first frequency channel and the second frequency channel being a combination of frequency channels partially overlappable with each other, and determine an overlapping relationship between the first frequency channel and the second frequency channel based on the channel arrangement information, calculate an interference from the first frequency channel to the second frequency channel, and calculate the interference by using a calculation formula including a first term corresponding to interference of a co-channel, a second term corresponding to a transmission characteristic of an apparatus that transmits the interference signal, and a third term corresponding to a reception characteristic of an apparatus that receives the desired signal.

\* \* \* \* \*